(12) United States Patent
Singh

(10) Patent No.: US 9,077,986 B2
(45) Date of Patent: Jul. 7, 2015

(54) ELECTRONIC VISUAL DISPLAYS

(75) Inventor: Darryl Singh, Auckland (NZ)

(73) Assignee: PURE DEPTH LIMITED, Auckland (NZ)

( * ) Notice: Subject to any disclaimer, the term of this patent is extended or adjusted under 35 U.S.C. 154(b) by 1061 days.

(21) Appl. No.: 13/061,131

(22) PCT Filed: Aug. 26, 2009

(86) PCT No.: PCT/NZ2009/000178
§ 371 (c)(1),
(2), (4) Date: Jun. 28, 2011

(87) PCT Pub. No.: WO2010/036128
PCT Pub. Date: Apr. 1, 2010

(65) Prior Publication Data
US 2011/0249026 A1  Oct. 13, 2011

(30) Foreign Application Priority Data

Aug. 27, 2008 (NZ) .................................. 570857

(51) Int. Cl.
G09G 5/00 (2006.01)
H04N 13/04 (2006.01)
G09G 3/00 (2006.01)
G09G 3/36 (2006.01)
G02F 1/1347 (2006.01)

(52) U.S. Cl.
CPC .......... H04N 13/0497 (2013.01); G02F 1/1347 (2013.01); G09G 3/003 (2013.01); G09G 2300/023 (2013.01); H04N 13/0495 (2013.01); G09G 3/36 (2013.01); G09G 2340/0464 (2013.01)

(58) Field of Classification Search
None
See application file for complete search history.

(56) References Cited

U.S. PATENT DOCUMENTS

| 8,120,547 B2 * | 2/2012 | Seymour ........................... 345/4 |
| 8,154,473 B2 * | 4/2012 | Engel et al. ...................... 345/4 |
| 8,416,149 B2 * | 4/2013 | Evanicky ......................... 345/4 |
| 8,436,873 B2 * | 5/2013 | Gao ............................. 345/634 |
| 2004/0008156 A1 * | 1/2004 | Kuroda et al. .................... 345/6 |

FOREIGN PATENT DOCUMENTS

| EP | 1093008 | 4/2001 |
| WO | 03040820 | 5/2003 |

* cited by examiner

Primary Examiner — Ryan R Yang

(57) ABSTRACT

An improved method and/or system to generate depth data for a 2D image for subsequent display on an MLD or other volumetric display. A multi-layered display (MLD) includes first and second display layers with one said display layer overlapping the other said display layer. The first display layer displays a first image and a second display layer displays a second image. The second image is synchronised with said first image such that an alteration of at least one image property of said first image triggers an alteration of at least one image property of said second image.

24 Claims, 11 Drawing Sheets

Figure 1
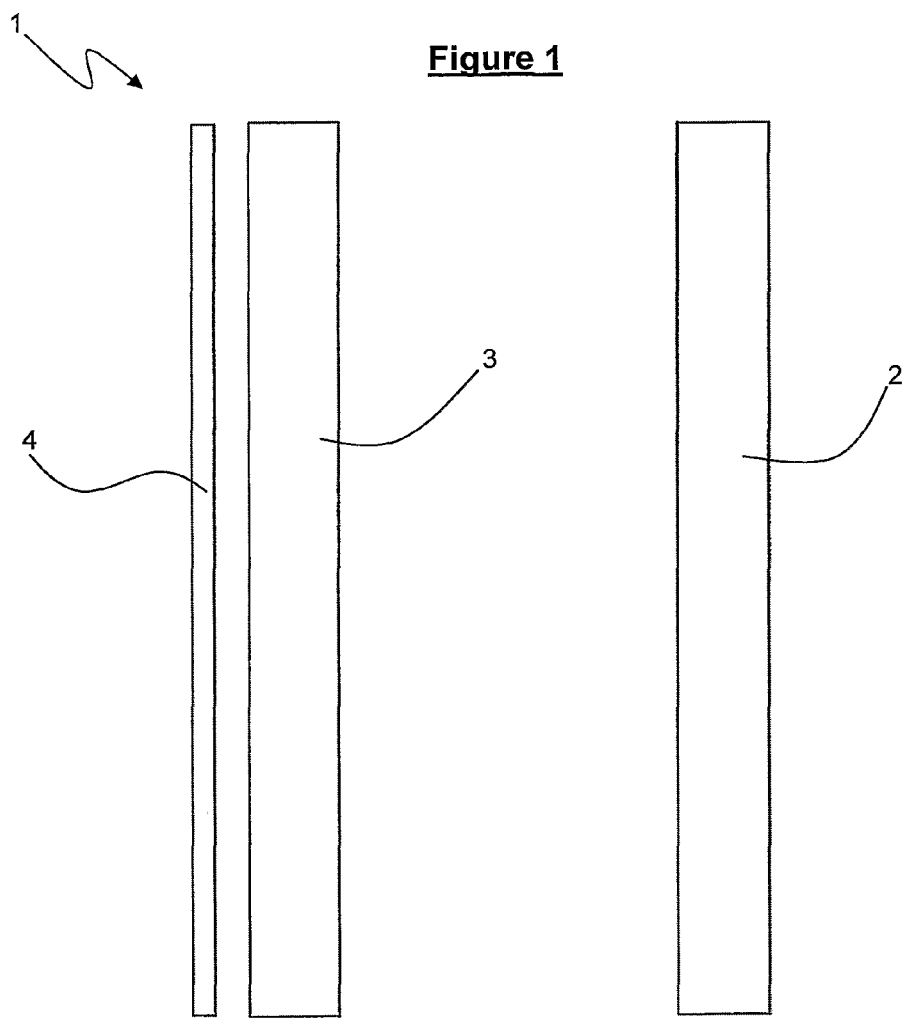
Fig 1a
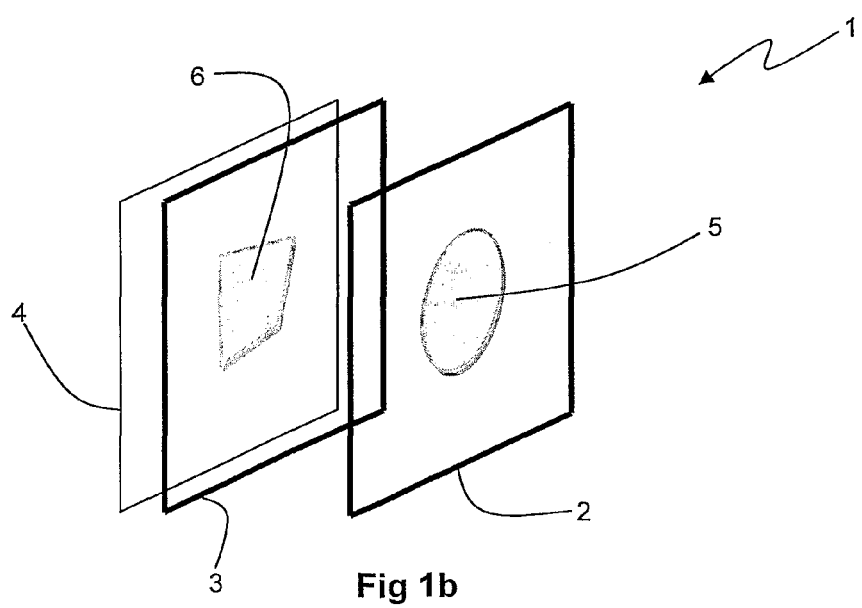
Fig 1b

Figure 3
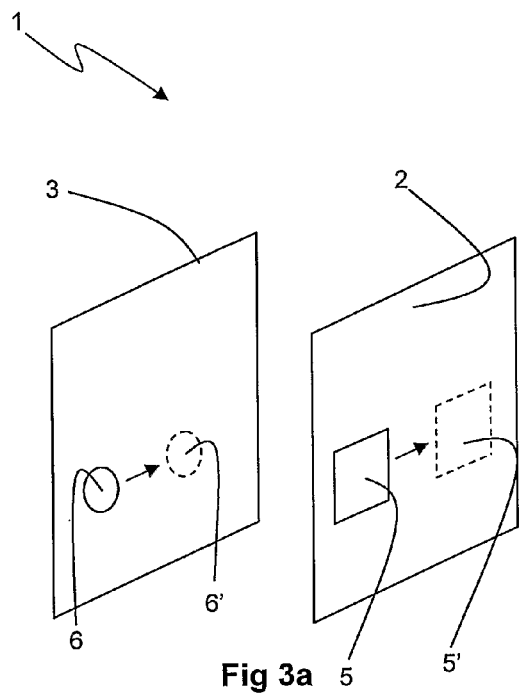
Fig 3a
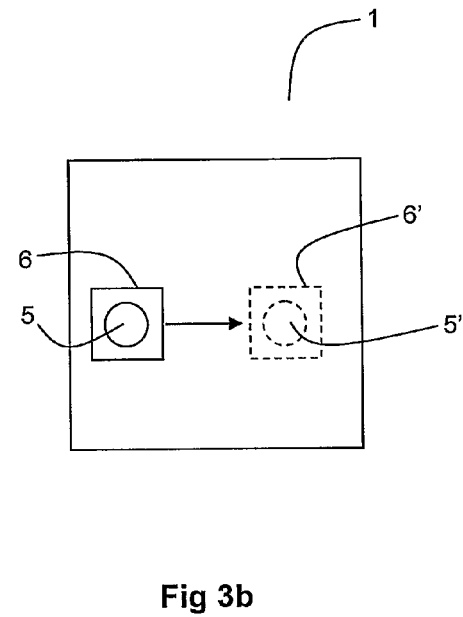
Fig 3b
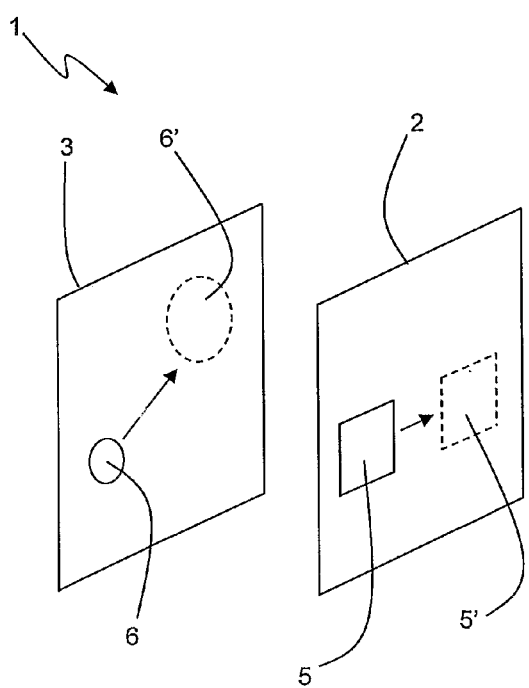
Fig 3c
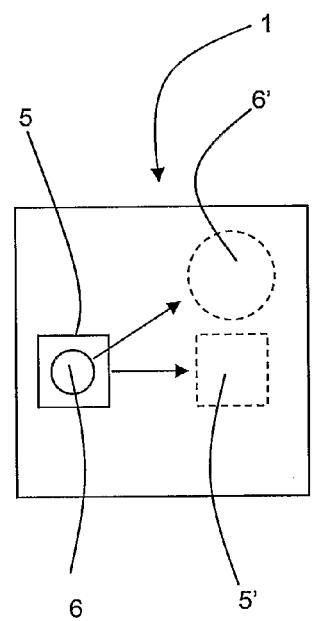
Fig 3d

Figure 4
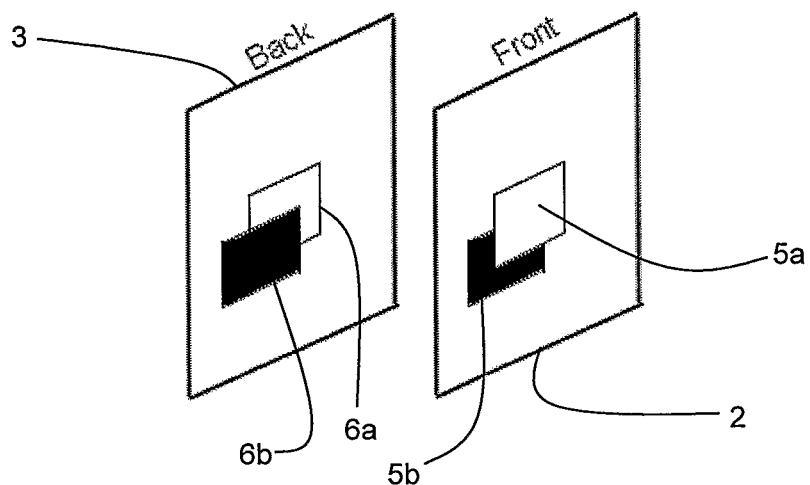
Fig 4a
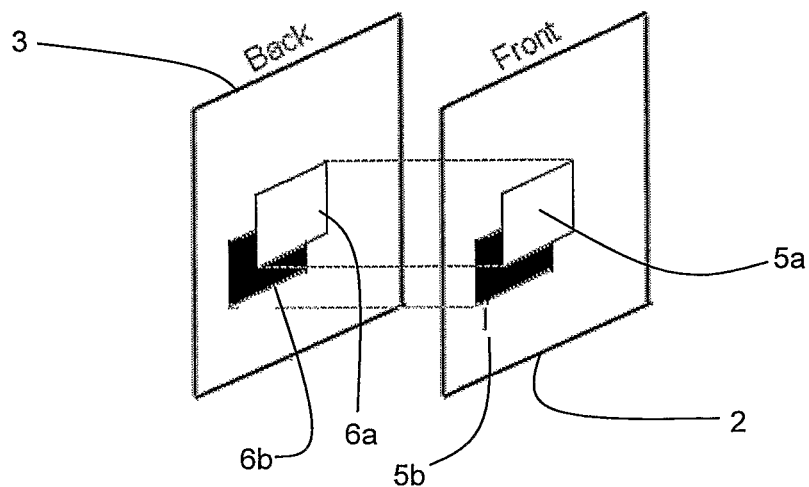
Fig 4b

Figure 10
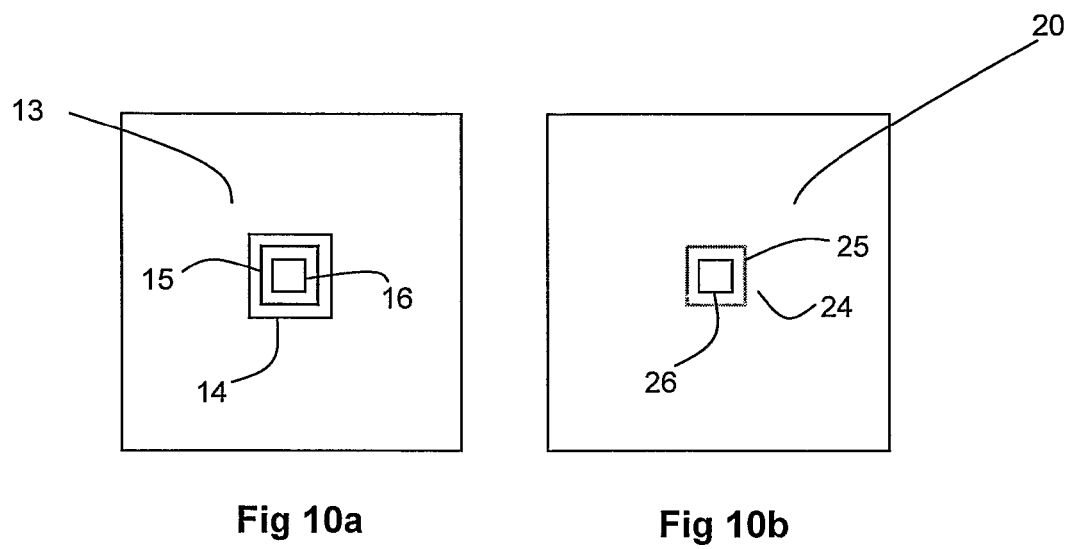
Fig 10a          Fig 10b
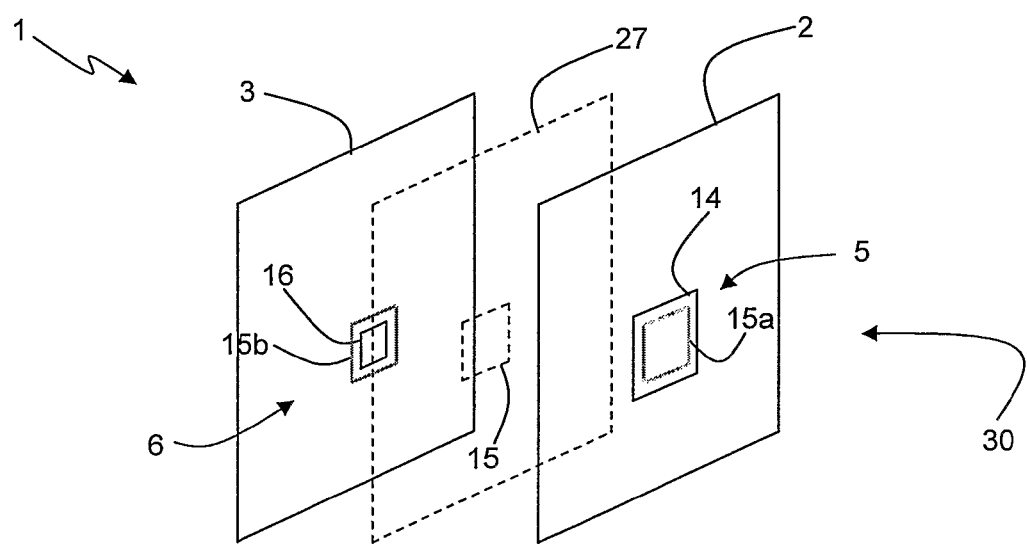
Fig 10c

Figure 11
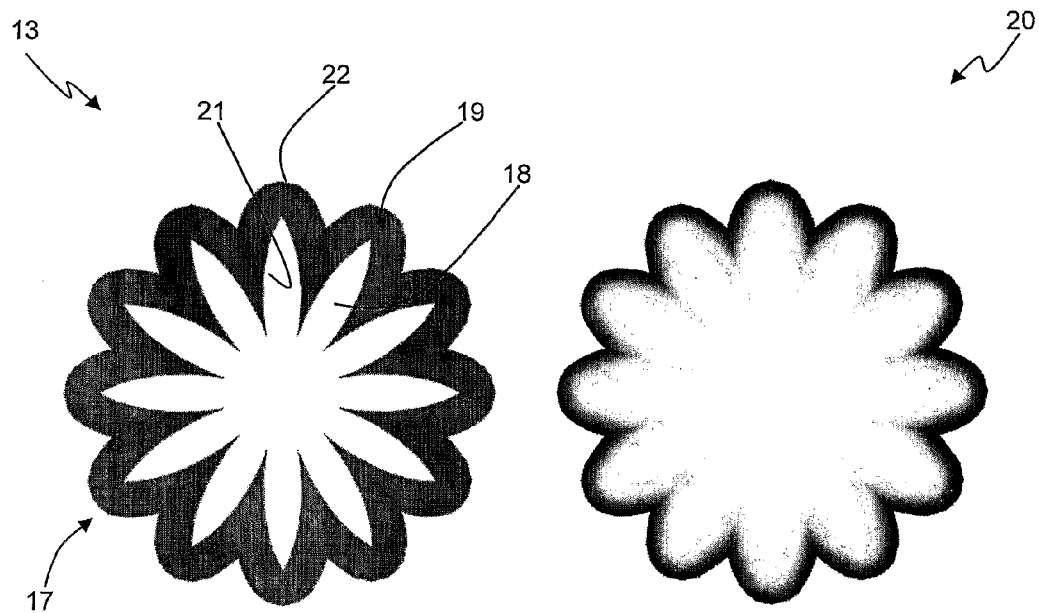
Fig 11a        Fig 11b
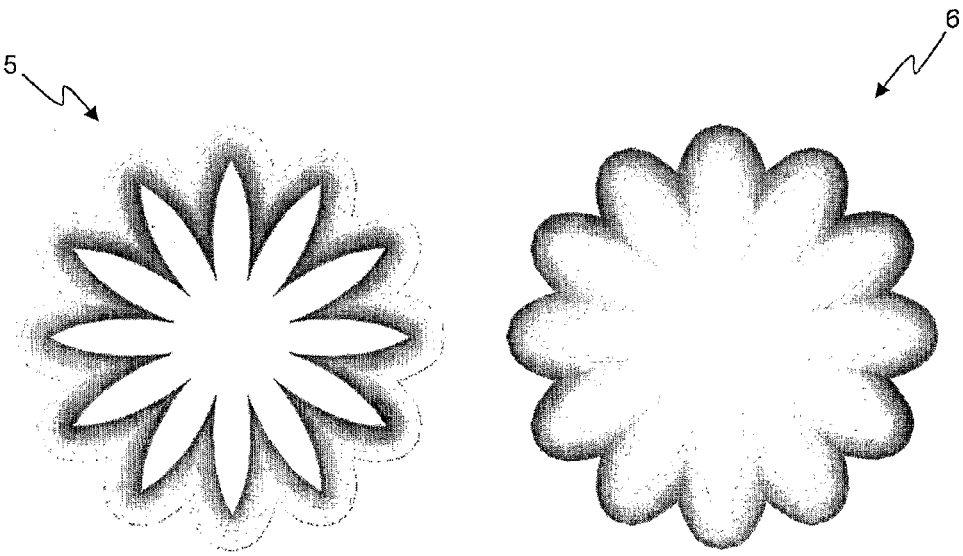
Fig 11c        Fig 11d

ELECTRONIC VISUAL DISPLAYS

RELATED APPLIATIONS

The present application is a National Stage Application filed under 35 U.S.C. §371 of International Patent Application Number PCT/NZ2009/000178, filed Aug, 26, 2009, which claims the benefit of New Zealand Patent Number 570857, filed Aug. 27, 2008. These applications are incorporated herein by reference in their entirety and for all purposes.

FIELD OF THE INVENTION

The invention relates to improvements in and relating to electronic visual displays and in particular to improved methods, systems and computer software for generating images on multi-focal plane displays.

BACKGROUND

Electronic display technology for displaying graphical images and/or text has evolved dramatically to meet the pervasive user demand for more realistic and interactive displays. A wide range of display technologies with differing capabilities are now available including:
  Cathode Ray Tube (CRT)
  Bistable display
  Electronic paper
  Nixie tube displays
  Vector display
  Flat panel display
  Vacuum fluorescent display (VF)
  Light-emitting diode (LED) displays
  Electroluminescent Displays (ELD)
  Plasma display panels (POP)
  Liquid crystal display (LCD)
    High-Performance Addressing (HPA)
    Thin-film transistor displays (TFT)
  Organic light-emitting diode displays (OLED)
  Surface-conduction electron-emitter display (SED) (experimental)
  Laser TV (forthcoming)
  Carbon nanotubes (experimental)
  Nanocrystal displays (experimental), using quantum dots to make vibrant, flexible screens.

However, most display technologies are generally only capable of displaying two-dimensional images on a single screen. The ability to form images at different depths within a display, whether real or perceived, has been the subject of significant and ongoing research and development in the quest to provide display technology capable of replicating or augmenting the depth effects conferred by normal human sight.

The manner in which human beings process visual information has been the subject of extensive and prolonged research in an attempt to understand this complex process.

This research has included the effects of depth or 'apparent depth' provided by volumetric, three-dimensional or multi-focal plane displays.

The term "preattentive processing" has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinizing for the presence of the said properties. Exactly what properties lend themselves to preattentive processing has in itself been the subject of substantial research. Colour, shape, three-dimensional visual clues, orientation, movement and depth have all been investigated to discern the germane visual features that trigger effective preattentive processing.

Researchers have conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It may be readily visualised for example that a red circle would be immediately discernible set amongst a number of blue circles.

Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 milliseconds as this only allows the user opportunity for a single 'look' at a scene. This timeframe is insufficient for a human to consciously decide to look at a different portion of the scene. Search tasks such as those stated above maybe accomplished in less than 200 milliseconds, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is included for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three dimensionality may be processed preattentively by the sub-conscious mind.

In comparison, if the constituent elements of the above described cubes are re-orientated to remove the apparent three dimensionality, subjects cannot preattentively detect targets which have been inverted for example. Additional experimentation by Brown et al [1992] confirm that it is the three dimensional orientation characteristic which is preattentively detected. Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 milliseconds threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) versus the number of distractors present solely in the depth plane of the target was also investigated. The results showed a number of interesting features including the significant modification of the response time resulting from the target presence or absence. In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

Three-dimensional or multi-focal plane displays are known to provide numerous advantages or capabilities unavailable with conventional two-dimensional displays. Examples of a three-Dimensional and multi-focal plane displays include Stereoscopic displays and Multi-Layer Displays (MLD) respectively.

Known three-dimensional displays seek to provide binocular depth cues to the viewer via a variety of techniques including separate head-mounted displays located directly in front of each eye, lenticular displays and holography. Unfortunately, each of these possesses certain limitations. Head-mounted displays add ergonomic inconvenience, reduce the viewer's peripheral awareness and are often cumbersome and can cause nausea, headaches and/or disorientation. Lenticular displays are only really effective at oblique viewing angles and holography is currently limited to displaying static images.

Stereoscopic (and auto-stereoscopic) displays provide the appearance of a 3D image by providing slightly different visual images to the left and right eyes of the viewer to utilise the binocular capabilities of the human visual system.

MLD systems are multi-focal plane displays that use multiple layered screens or 'display layers' aligned parallel with each other in a stacked arrangement with a physical separation between each screen. Each screen is capable of displaying images on a different focal plane and thus such MLD systems are often referred to as Multi-focal plane displays. Thus, multiple images separated by a physical separation or 'depth' can be displayed on one display. PCT Publication No. WO 99142889 discloses such an MLD in which depth is created by displaying images on the background screen furthest from the viewer which will appear at some depth behind images displayed on the screen(s) closer to the user. The benefits of MLDs, in particular those utilising the technology described in the published PCT Patent Publication Nos. WO 1999/042889 and WO 1999/044095 are gaining increasingly widespread recognition and acceptance due to their enhanced capabilities compared to conventional single focal plane displays (SLD).

The benefits of MLDs are especially germane to displays using liquid crystal displays (LCD), though MLDs can also be formed using other display technologies, e.g. an LCD front display layer may be layered in front of an OLED rear display layer.

There are two main types of Liquid Crystal Displays used in computer monitors, passive matrix and active matrix. Passive-matrix Liquid Crystal Displays use a simple grid to supply the charge to a particular pixel on the display. Creating the grid starts with two glass layers called substrates. One substrate is given columns and the other is given rows made from a transparent conductive material. This is usually indium tin oxide. The rows or columns are connected to integrated circuits that control when a charge is sent down a particular column or row. The liquid crystal material is sandwiched between the two glass substrates, and a polarizing film is added to the outer side of each substrate.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel.

The passive matrix system has significant drawbacks, notably slow response time and imprecise voltage control. Response time refers to the Liquid Crystal Displays ability to refresh the image displayed. Imprecise voltage control hinders the passive matrix's ability to influence only one pixel at a time. When voltage is applied to untwist one pixel, the pixels around it also partially untwist, which makes images appear fuzzy and lacking in contrast. Active-matrix Liquid Crystal Displays depend on thin film transistors (TFT). Thin film transistors are tiny switching transistors and capacitors. They are arranged in a matrix on a glass substrate.

To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle. And if the amount of voltage supplied to the crystal is carefully controlled, it can be made to untwist only enough to allow some light through. By doing this in very exact, very small increments, Liquid Crystal Displays can create a grey scale.

Most displays today offer 256 levels of brightness per pixel. A Liquid Crystal Display that can show colours must have three sub-pixels with red, green and blue colour filters to create each colour pixel. Through the careful control and variation of the voltage applied, the intensity of each sub-pixel can range over 256 shades. Combining the sub-pixel produces a possible palette of 16.8 million colours (256 shades of red×256 shades of green×256 shades of blue). Liquid Crystal Displays employ several variations of liquid crystal technology, including super twisted nematics, dual scan twisted nematics, ferroelectric liquid crystal and surface stabilized ferroelectric liquid crystal. They can be lit using ambient light in which case they are termed as reflective, backlit and termed Transmissive, or a combination of backlit and reflective and called transflective.

There are also emissive technologies such as Organic Light Emitting Diodes (OLED), and other similar technologies which project an image directly onto the back of the retina which are addressed in the same manner as Liquid Crystal Displays.

To aid clarity and avoid prolixity, reference herein will be made to an "MLD" with two display layers, i.e. an MLD having front and rear display layers. However, this should not be seen to be limiting as the MLD may include three or more display layers as required by the application.

In general an MLD is used to simultaneously display images on the front and rear display layers. The MLD is configured to display output image data from a computer system, video/image feed or other image generator and in most applications the images are composite images formed from multiple image components, e.g. a foreground object and a background scene or a computer mouse cursor and computer software Graphical User Interface GUI. The image components may be displayed on the same display layer or spread between both display layers.

For ease of reference, the position of the image components or 'graphical objects' on each display layer can be given as a range of orthogonal x and y co-ordinates representative of the spatial position of the image component in the plane of a display layer relative to a common fixed reference point, e.g. the edge of a display layer, viewer's position or a fixed external focal point.

However, existing computer operating systems, computer graphic controllers and software have to date not been optimised or configured for volumetric displays such as the aforementioned MLD system. Current operating systems have graphics engines that are capable of generating an image for display on two display screens in only three primary modes, either in 'clone', 'dual' or 'extended' display modes. In the clone mode, both screens display the same images and changes on one screen are reflected in the other. In the dual display mode, the screens display independent images and operate independently, with the user selecting which screen to interact with. In the 'extended' display mode the two screens in effect operate together as an enlarged single screen with images capable of being spread between the screens across a common border, e.g. the right hand side of one screen and the left hand side of the other screen.

MLD systems can therefore be used with existing operating systems and software by treating the rear display layer as a separate screen in clone, dual or extended display modes. As the images are displayed on the different display layers, the separation between the display layers provides physical and perceived separation between those images.

For example, in one possible application, a picture editing computer program may be used where the GUI and original picture may be displayed on a rear display layer while the GUI 'toolbars' are displayed on the front display layer, i.e. using a dual or extended display mode. The toolbars will thus always appear in front of the rest of the GUI and the picture. However, if the user wants to 'reposition' the GUI and toolbars together, i.e. maintaining the spatial relationship therebetween, they must each be separately manually 'dragged' into position. There is no way to move or manipulate these two windows together with a single user action. The manual repositioning requirement is clearly undesirable and hampers user operability.

The majority of video or graphical content designed for display on an MLD are configured to display in the 'extended' mode. However, in order for such 'MLD content' to be viewed correctly it has to be played back in a video player that is capable of displaying a 'double-wide' resolution, i.e. extending across both display layers. An example of such a video player is QuickTime® which can play video in double wide resolution (e.g.: 2560×768—where 2560 is double a 1280 pixel wide resolution). However, in order for a developer to view and assess the effectiveness of the MLD content, the content must be exported to the double wide resolution and run before the developer can view what they are creating. However, double-wide video players use the entire viewable area to show MLD content in this way. This presents a problem if the developer does not want to lose context of the rest of their work space for example, or the content development environment and GUI.

Thus, in order to arrange images for display on the different display layers of an MLD using conventional single layer display (SLD) operating systems, a user has two options, i.e. to:

1. Manually position images on the front and/or rear layer OR
2. Generate a "double-wide" window that will span across both layers of an MLD device, though this method works in full screen mode only, The developer must generate images for different layers that will make up the MLD images. This process may involve a time-dependent frame rendering process as each frame for each layer is generated and optimised independently. This creates a number of time consuming steps, including creation of different image layers or sets and arranging the image layers so that they are synchronised. This process must be repeated every time content is modified.

It would thus be advantageous to provide a means for maintaining the spatial relationship between images on different display layers of an MLD during repositioning of one of the images.

In general, graphical content and images designed for an MLD are created with an image pair comprising a rear and a front image corresponding to rear and front display layers. Further images may be added if the MLD includes more than two layers. Each image must therefore be created separately. One exemplary method of generating front and rear image pairs is described in PCT publication WO03/040820 where two identical images are displayed on the front and rear display layers and the luminance of each image is varied to create the perception that a composite image is 'floating' between, in front, or behind the display layers.

It is also possible to generate image pairs from three-dimensional (3D) data (e.g. having x, y, z coordinates for image parts) by processing the depth or "z" data of the images and then displaying on the front or rear display layer as determined by their relative depth. The collective depth data of a 3D image or images is known as a depth map which is also used to generate left and right eye image pairs (instead of front and rear image pairs) for 3D stereoscopic drivers and displays. The stereoscopic image generation process is also reliant on the existence of the depth data, though processes the depth data differently to volumetric displays such as an MLD. For example, stereoscopic displays present slightly different images to the left and right eye of a viewer emulating the naturally different perspective of the viewer's eyes if they were viewing a 3D object, i.e. stereoscopic displays emulate binocular vision of a 3D object. In contrast, images for volumetric displays are split between front and rear display layers and thus provide a physical depth between the images.

The depth map from 3D data can be processed to create the "depth fusion" effect on an MLD as described in PCT publication WO03/040820. However, creating a realistic 3D representation can be a difficult and time consuming task, even for experienced 3D artists. 2D images do not normally contain 3D data and thus cannot be readily adapted to an MLD without substantial work generating the depth data. Current image editing software is also not designed to operate in multiple display layers of an MLD. Thus, to create 3D content, the developers for MLD systems typically work with 2D image content that is displayed on a single 2D display when using common content editing tools, e.g. picture or video editors. Each image is then assigned to the front or rear layer as required. This can be an extremely time consuming and error-prone method as the assigning of images to front and rear layers is normally completed in a 2D workspace with the front and rear image pairs being positioned in adjacent windows in the workspace on a double wide window. Acceptable results may only be obtained after several attempts in aligning the images, increasing the time required and therefore the cost of MLD content generation.

One of the main problems with developing 3D content with existing 2D editing software is that there is no automated way to synchronise related images to be displayed on different display layers so that they move and alter together as they are edited. Instead, a user must move each image independently.

It would thus be advantageous to provide an improved method and/or system to generate depth data for a 2D image for subsequent display on an MLD or other volumetric display.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

DISCLOSURE OF INVENTION

Disclosure of Invention

The following terminology will be used throughout the specification and the intended meaning of each term is described below.

It will be appreciated that as used herein, the term:

"image" refers to any visible effect, including a graphical image, still images, video, frames of a video or other moving imagery, frame-less moving imagery, graphical objects, text, pattern, symbol, design, shadow or other visible effect;

"graphical object" refers to any part or portion of an image and may include multiple distinct images or image parts, contiguous portions of the same image, non-contiguous portions of the same image.

"image data" refers to any information or data specifying an aspect, facet or parameter of an image or part thereof, e.g. position, size, shape, orientation, colour, contrast, brightness, intensity, hue, position, shading, depth, or any other aspect, facet or parameter;

"display" refers to any display system including one or more electronic display layers capable of generating a visible image and may include, by way of example, one or more display layers formed from a: Cathode Ray Tube (CRT), Liquid Crystal Display (LCD), Organic Light Emitting Diode (OLED), Light Emitting Diode (LED), Plasma display panels (PDP), Surface-conduction electron-emitter display (SED), Laser TV, or any other known or future display technology;

"spatial relationship" refers to the spatial relationship between two images or parts of an image with respect to their displayed position.

"manipulating", "manipulate" and "manipulation" includes conversion, repositioning, duplication, interpretation, processing, deleting, copying, splicing, interlacing, transferring, transmitting, transposing and/or re-arranging of image data;

It should be noted that reference herein to the singular also includes the plural and vice versa.

For ease of reference, computer program (hereinafter software) algorithms, procedures, functions, engines and other software components are described individually with respect to their intended function. However, it should be appreciated that these software components may also be combined, operated independently, interlinked, integrated or otherwise manipulated without departing from the spirit or scope of the present invention.

Reference herein to an MLD having two display layers should not be seen to be limiting as the principles of the present invention may be easily extrapolated for display on an MLD with three or more display layers.

According to a first aspect of the present invention there is provided a multi-layered display (MLD), including:
a first display layer including a first plurality of pixels, the first display layer operable to display a first image using at least some of said pixels;
a second display layer including a second plurality of pixels, the second display layer operable to display a second image using at least some of said second plurality of pixels, wherein one said display layer overlaps the other said display layer;
wherein said second image is synchronised with said first image such that an alteration of at least one image property of said first image triggers an alteration of at least one image property of said second image.

Preferably said altered image property of the second image is the same image property as altered in the first image.

The first and second images are thus 'synchronised' such that, when the first image is altered, a corresponding predetermined alteration is made to the second image. Thus, reference herein to 'synchronised' images hereby refers to a first and second image pair in which alterations to an image property of the first image, trigger alterations in an image property of the second image, whether identical, similar or different image properties or alterations.

According to a first aspect of the present invention there is provided a computer-implemented method of generating images on a multi-layered display (MLD), the MLD including:
- a first display layer including a first plurality of pixels, the first display layer operable to display a first image using at least some of said pixels;
- a second display layer including a second plurality of pixels, the second display layer operable to display a second image using at least some of said second plurality of pixels, wherein one said display layer overlaps the other said display layer;

wherein said computer-implemented method includes:
  execution of an image generation algorithm embodied in computer readable instructions stored in a computer-readable medium, said image generation algorithm executable to generate first and second image data specifying at least one image property of said first and second images respectively;

whereupon receiving input instructions to display the first image with an altered image property on the respective first display layer, said image generation algorithm generates new first image data specifying said image property alteration of said first image and new second image data specifying a predetermined image property alteration of said second image, said first and second images then being displayed on said first and second display layers with said respective image property alterations.

According to a second aspect of the present invention there is provided a computer system configured to generate images on a multi-layered display (MLD), the MLD including:
- a first display layer including a first plurality of pixels, the first display layer operable to display a first image using at least some of said pixels;
- a second display layer including a second plurality of pixels, the second display layer operable to display a second image using at least some of said second plurality of pixels, wherein one said display layer overlaps the other said display layer;

wherein said computer system includes a system memory coupled by a bus to a processor, and wherein the system memory stores executable computer readable instructions embodying an image generation algorithm for generating first and second image data specifying at least one image property of said first and second images respectively;

said computer system configured to process said first and second image data and respectively output a first and second image data signal to said first and second display layers for displaying said first and second images with said image property as specified by said image data;

whereupon receiving instructions to display the first image with an altered image property on the respective first display layer, said image generation algorithm generates new first image data specifying said image property alteration of said first image and new second image data specifying a predetermined image property alteration of said second image, said first and second images then being displayed on said first and second display layers with said respective image property alterations.

Preferably, said computer system includes a graphic controller configured to receive said first and second image data and respectively output a first and second image data signal to said first and second display layers for displaying said first and second images with said image property as specified by said image data.

In an alternative embodiment, the processor may be configured to receive said first and second image data and respectively output a first and second image data signal to said first and second display layers for displaying said first and second images with said image property as specified by said image data.

The image property preferably includes at least one of: displayed position, size, scale, colour, contrast, hue, orientation, shadow, visibility, brightness, transparency, perceived depth, overlapping order or any other visual property of at least a part of the images.

To illustrate the advantages of the present invention reference may be made to the images as being graphical 'windows' or 'components' of a GUI. For example, the aforementioned computer system may be used with operating systems using a windowed user interface, e.g. Microsoft® Windows™ where the first and second images are program 'windows', 'toolbars' or other components of a GUI.

In one preferred embodiment, said image property alterations of said first and second images are identical, i.e. not only is the same image property altered but the same image property is altered in the same way.

In a further embodiment, said image property altered in the first and second images includes the displayed positions of the first and second images. Thus, when the first image is displayed in an altered position, the second image will also be displayed in an altered position to maintain the spatial relationship or relative position between the images.

In another embodiment, said image property includes the size of the first image. Thus, when the first image is enlarged or reduced, the second image will also be enlarged or reduced commensurately.

While in preferred embodiments the image properties are altered identically in both the first and second images, it should be appreciated that predetermined rules may be provided for altering the second image in a different way, e.g. a repositioning of a GUI window (first image) to the left of a front display layer may result in an enlargement of another GUI window (second image) on a rear display layer. This may thus be useful in providing various user-interface effects. It will be appreciated that numerous permutations of image property alteration combinations in the first and second images are possible and for sake of clarity all possible combinations are not detailed.

It will also be appreciated that more than two images may be synchronised and reference herein to only first and second images should not be seen to be limiting. It should also be appreciated that multiple sets of synchronised images may be displayed on a single MLD.

Where multiple synchronised image pairs are displayed, the spatial relationship between the first image and other 'first' images on the first display layer is preferably altered independently of the spatial relationship between the second image and other images on the second display layer. For example, the stack order of overlapping images on a common display layer can thus be altered without affecting the stack order of the images on the other display layer. However, where the stack order or other spatial relationship is important to be maintained on both layers, e.g. to avoid confusion, alteration of the spatial relationship between the first image and other images on the first display layer may result in a corresponding alteration of the spatial relationship between the second image and other images on the second display layer.

Preferably, the memory stores metadata specifying said first and second images are a pair of synchronised images.

In one embodiment, the metadata may take the form of an image register containing a database of the images for display and whether or not any two or more images form a synchronised pair. In one alternative embodiment, the metadata may include a computer-readable synchronisation code such as a pairing code, metadata tag or other readable identifier applied to the first and/or second image data.

The first and second images may be treated as distinct graphical objects occupying an area of a respective display layer and the metadata applied to datasets for each image. Alternatively, the metadata may be applied to individual addressable elements, e.g. pixels.

In one embodiment, the metadata includes an image register that maintains a register of images displayed or to be displayed and whether or not any two or more of said images form a synchronised first and second image pair, said image generation algorithm querying said register upon receiving an image alteration instruction to determine if a first image to be altered is synchronised with a second image on a different display layer, said image generation algorithm generating new first image data specifying said image property alteration of said first image and new second image data specifying a predetermined image property alteration of said second image, said first and second images then being displayed on said first and second display layers with said respective image property alteration. The images may be manually 'added' to the register, e.g. by a user input such as a user 'selection' of the first and second images or automatically added during development or upon execution of a particular procedure.

In an alternative embodiment, the first and second image data may include metadata including a computer-readable synchronisation code such as a pairing code, metadata tag, common attribute or other computer readable identifier specifying the first and second images are to be synchronised, said image generation algorithm including a procedure executable to read said synchronisation code and thereby generate new first and second image data specifying respective image property alterations.

The metadata may be encoded in the image data or provided separately. The synchronisation may be manually added, e.g. by a user input such as a user 'selection' of the first and second images or automatically added during development or upon execution of a particular procedure.

In one embodiment, the image generation algorithm may include a procedure executable to identify metadata including a predetermined common attribute of the first and second image, said image generation algorithm generating new image data for the first and second images with the common attribute. The common attribute may be any image property or any other attribute, e.g. images running in the same software application may be considered to have common attributes. Thus, images on both layers belonging to the same application set can be synchronised.

In yet another embodiment, the metadata includes "x" and "y" co-ordinates (i.e. two-dimensional coordinates) representative of the spatial position of the first and second images relative to a common fixed reference point, e.g. the edge of a display layer, viewer's position or a fixed external focal point, wherein the image generation algorithm includes procedures for determining:
- if the x and y coordinates of the first and second images are the same (i.e. there is an overlap), the images thus considered to be synchronised, and
- if the first image is altered, said image generation algorithm then generating new first image data specifying said image property alteration of said first image and new second image data specifying a predetermined image property alteration of said second image, said first and second images then being displayed on said first and second display layers with said respective image property alteration.

Preferably, the computer system is operatively connected to a user interface device for receiving user input specifying a said image property alteration of said first image.

As it is necessary to identify where an alteration to an image occurs, the system memory preferably also stores an alteration identification algorithm capable of identifying an alteration to an image property and returning data relating to the image property altered and preferably also the image the alteration relates to.

According to one aspect, the alteration identification algorithm includes a "global hook" or "call back" procedure which identifies image property alteration events and the image altered, and for each image property alteration where corresponding synchronised images exist, said image generation algorithm will generate new image data for each of said synchronised images.

In an alternative embodiment, the alteration identification algorithm includes a periodic timer (running, for example, at 30 times a second) operable to execute a procedure which will identify all synchronised images.

The alteration identification algorithm thus provides a means for 'background' monitoring any image property alterations without requiring modification of the images or code of the software applications displayed According to a further aspect of the present invention there is provided an image generation algorithm embodied in computer readable instructions stored in a computer-readable medium, said image generation algorithm executable to generate first and second image data specifying at least one image property of said first and second images respectively;
whereupon receiving input instructions to display the first image with an altered image property on the first display layer, said image generation algorithm generates new first image data specifying said image property alteration of said first image and new second image data specifying a predetermined image property alteration of said second image.

According to a further aspect of the present invention there is provided a content development engine embodied in computer-readable instructions executable to:
process input instructions specifying the respective display layer on which the first and second images are to be displayed;
process input instructions specifying that the first and second images are to be synchronised
generate metadata specifying said first and second images are synchronised.

The input instruction may be provided by manual user input or automated input.

The aforementioned methods, computer software and systems thus provide a means for simultaneously altering synchronised images on multiple display layers when only one of the images is altered, thereby obviating the need to alter each image on each display layer individually.

According to another aspect of the present invention there is provided a computer-implemented method of generating a split-ratio depth map of a target image for display on a multi-layered display (MLD) as first and second images, the MLD including:
a first display layer including a first plurality of pixels, the first display layer operable to display said first image using at least some of said pixels;

a second display layer including a second plurality of pixels, the second display layer operable to display said second image using at least some of said second plurality of pixels, wherein said first display layer overlaps said second display layer and said first image is displayed on said first display layer overlapping said second image on said second display layer.

wherein said computer-implemented method includes:
  a) assigning an image property split-ratio to at least one portion of the target image, said image property split-ratio specifying the first and second proportions of the image property of said target image portion that are to be respectively displayed as said first and second images;
  b) repeating step a) for each portion of said target image to generate a split-ratio depth map.

Preferably, the split-ratio depth map is generated by creating a visual representation of the image property split-ratio and wherein said image property is one or more of pixel intensity, colour, contrast, brightness, hue or other image property capable of visually representing a scale of split-ratio values. The split-ratio depth map ("or split-ratio image") can thus be generated in common 2D image editing tools and thereby obviates the need for many of the complex MLD image-editing tools.

According to a further aspect there is provided a computer-implemented method of modifying a target image for display on a multi-layered display (MLD) as first and second images, the MLD including:
  a first display layer including a first plurality of pixels, the first display layer operable to display said first image using at least some of said pixels;
  a second display layer including a second plurality of pixels, the second display layer operable to display said second image using at least some of said second plurality of pixels, wherein said first display layer overlaps said second display layer and said first image is displayed on said first display layer overlapping said second image on said second display layer.

wherein said computer-implemented method includes:
  assigning a split-ratio to an image property of at least one portion of the target image, said split-ratio specifying the first and second proportions of the image property of said target image portion that are to be respectively displayed as said first and second images;
  generating said first image on said first display layer such that at least some of the first plurality of pixels displays said first image property proportion of the target image portion;
  generating said second image on said second display layer such that at least some of the second plurality of pixels displays said second image property proportion of the target image portion.

Preferably, said method is repeated for each portion of the target image. A 'depth map' of the target image is thus created which specifies how the target image is to be distributed between the display layers depending on the split-ratio for each portion of the target image. Each portion of the target image is then distributed between the display layers of the MLD depending on the depth value of that particular portion as assigned by the split ratio.

Reference herein will be made to the target image portion being a pixel of the target image or equivalent element. However, it should be appreciated that reference herein to a "target image portion" may also include any definable portion of the target image, ranging in size from the smallest discrete addressable element (e.g. a pixel) to an image substantially filling the display layer area.

Preferably, the image property is one or more of intensity, colour, contrast, brightness, hue or other image property capable of visually representing a scale of split-ratio values.

In a further embodiment, the image property includes pixel brightness and the split-ratio is represented by a greyscale image. The 'depth' or "Z" value of a particular image portion (e.g. a pixel) may thus be provided as a greyscale value between full black (low brightness) assigned a value of "0" and full white (high brightness) which is assigned a value of "1". If a target image portion is assigned a value of 1 or greater, that target image portion is displayed only as part of the first image on the first display layer and conversely a target image portion assigned a greyscale value of 0 or less is only displayed as part of the second image on the second display layer or vice versa.

A target image portion assigned an intermediate greyscale value will be displayed in both the first and second images on both display layers but with the pixel intensity differing in each image. For example, in one embodiment if a target image portion has a split-ratio of 0.7 the target image portion may be displayed in the first image with an intensity of 0.7 and displayed in the second image with an intensity of 0.3.

In another embodiment, the image intensity distribution may be proportional to a non-linear function, e.g. a particular pixel intensity may be proportional to the square root of the depth value.

Thus, a split-ratio depth map may be applied to a target image to distribute the target image between the display layers. Where the split-ratio depth map has portions with a continuous gradient, then the aforementioned method will generate first and second images which are blended between the first and second display layers. Where split-ratio depth map has portions with a discrete gradient, then the aforementioned method will generate first and second images which have solid colour in either the first or second display layer and be transparent in the other display layer.

The split-ratio map intensity distribution may be applied to one or more of the colours of each target image portion, e.g. typical displays have a set of colour filters e.g. Red Green Blue (RGB) filters, the split-ratio map thus specifies the colour intensity of each pixel in each colour channel. Alternatively, separate split ratio depth maps may be provided for each colour channel.

In a further embodiment, a said split-ratio depth map may be generated using the aforementioned method for each colour filter.

Most displays are capable of displaying a greyscale with 256 different shades between white and black and may be readily used with the aforementioned methods.

In another embodiment, the image property includes a colour-scale. For example, the colour scale may extend across the human-visible light frequency spectrum, with a depth value of "0" being assigned to the 'red' end of the scale and a depth value of "1" assigned to the opposing 'violet' end of the scale or vice versa. It will thus be appreciated that any visual image property scale may be used.

Varying the pixel intensity of overlapping portions of the first and second images according to the present invention enables a composite image to be displayed which is perceived by the viewer as being distributed between the display layers with portions at some point intermediate, on, in front of or behind the display layers depending on the split-ratio as assigned by the depth map. While the images are displayed only on the display layers, the human visual system perceives a 3D volumetric image as there is a smooth intensity gradient between the front and rear portions.

It will be appreciated that the aforementioned methods may be performed on more than two target images and reference herein to only a single target image should not be seen to be limiting.

According to a further aspect, the target image portion is respectively displayed as first and/or second images on the first and/or second display layers according to the functions:

$$First\_Image(x,y) = Target\_Image(x,y) * Input\_Depth(x,y)$$

$$Second\_Image(x,y) = Target\_Image(x,y) * (1.0 - Input\_Depth(x,y))$$

Where:
- First_Image(x,y) is the image property value of the first image portion at position (x,y) on the first display layer;
- Second_Image(x,y) is the image property value of the second image portion at position (x,y) on the second display layer;
- Target_Image(x,y) is the image property value of the target image portion at position (x,y);
- Input_Depth(x,y) is the depth value of the target image portion at position (x,y) as specified by the split-ratio depth map.

While the aforementioned method uses a linear interpolation, it will be appreciated that, quadratic, exponential, logarithmic or other types of functions may be used to achieve the desired distribution of the target image between the display layers.

Thus, according to another aspect, there is provided a method of respectively displaying said target image as said first and/or second images on the first and/or second display layers, wherein said image property includes colour R (red), G (green), B (blue) intensity values of each said target image portion, wherein the intensity value of said R, G, B colour intensities are defined by:

$$t = P((Z-Z1)/(Z2-Z1), 0, 1)$$

$$R1 = Q(R, t)$$

$$R2 = Q(R, 1-t)$$

$$G1 = Q(G, t)$$

$$G2 = Q(G, 1-t)$$

$$B1 = Q(B, t)$$

$$B2 = Q(B, 1-t)$$

Where:
- Z1 is the depth of the first display layer;
- Z2 is the depth of the second display layer;
- Z is the depth of the target image portion as assigned by the depth map;
- P is a function of the depth of the target image portion, (assigned a value between 0 and 1) relative to the depth (Z1 Z2) of the first and second display layers;
- T is a split-ratio value assigned by the function P for a particular depth Z value;
- Q is a function of the split-ratio value;
- R1 is the R intensity value of the first image portion;
- R2 is the R intensity value of the second image portion;
- G1 is the G intensity value of the first image portion;
- G2 is the G intensity value of the second image portion;
- B1 is the B intensity value of the first image portion;
- B2 is the B intensity value of the second image portion;

Preferably, said R, G, and/or B intensity values as calculated by said Q function(s) are proportional to the square root of said split-ratio value T.

It will be appreciated that numerous Q functions are possible for use in the present invention and by way of example may include exponential, logarithmic, polynomial, or other equations.

According to another aspect of the present invention there is provided a computer system configured to modify a target image for display on a multi-layered display (MLD) as first and second images, the MLD including:
- a first display layer including a first plurality of pixels, the first display layer operable to display a first image using at least some of said pixels;
- a second display layer including a second plurality of pixels, the second display layer operable to display a second image using at least some of said second plurality of pixels, wherein one said display layer overlaps the other said display layer;

said computer system including:
- a system memory coupled by a bus to a processor, and wherein the system memory stores executable computer readable instructions embodying a image generation algorithm for generating first and second image data specifying at least one image property of said first and second images respectively;

wherein said computer system is configured to receive said first and second image data and respectively output a first and second image data signal to said first and second display layers for displaying said first and second images with said image property as specified by said image data, and wherein said system memory stores executable computer readable instructions embodying an image depth algorithm executable to:
- assign a split-ratio to an image property of at least one portion of the target image, said split-ratio specifying the first and second proportions of the image property of said target image portion that are to be respectively displayed as said first and second images;

and wherein said image generation algorithm generates:
- said first image data, specifying said first image property proportion of the target image portion to be displayed as said first image, and
- said second image data, specifying said second image property proportion of the target image portion to be displayed as said second image.

According to yet another aspect of the present invention there is provided an image depth algorithm embodied in computer executable instructions and executable to:
- assign a split-ratio to an image property of at least one portion of the target image, said split-ratio specifying the first and second proportions of the image property of said target image portion that are to be respectively displayed as said first and second images.

As explained in the "background art" section, assigning depth values in the prior art was difficult, time-consuming and prone to errors. In contrast, the aforementioned methods, systems and software may provide substantial advantages over the prior art as the depth map can be created simply by generating a 2D image and using a greyscale or other visible scale to represent depth. These values can then be automatically processed with the target image to distribute the target image between display layers at the depth specified.

The first and second images generated by applying the depth map to the target image are preferably displayed to overlap each other along an optical axis extending approximately orthogonal to the planes of the display layers. This alignment ensures that a viewer positioned with viewer's fixation axis along the optical axis will see the first and second images as being coterminous and therefore forming a composite image that maintains the appearance of the target image but appears to be distributed between the layers. Misalignment between the fixation axis and optical axis may result in parallax error as the first and second images will not appear to be overlapping. In the MLDs as used by the applicant, a certain degree of such misalignment can occur before parallax error becomes noticeable.

It will thus be appreciated that the first and second images must be overlapping in most applications. Thus, any repositioning or other alteration of the first image requires corresponding repositioning or alteration of the second image. As discussed previously, prior art development tools require each image to be manipulated separately. Therefore, According to yet another aspect of the present invention, there is provided a method of synchronising said first and second images using a computer-implemented method of generating images on a multi-layered display (MLD), the MLD including:
- a first display layer including a first plurality of pixels, the first display layer operable to display a first image using at least some of said pixels;
- a second display layer including a second plurality of pixels, the second display layer operable to display a second image using at least some of said second plurality of pixels, wherein one said display layer overlaps the other said display layer;

wherein said computer-implemented method includes:
- execution of an image generation algorithm embodied in computer readable instructions stored in a computer-readable medium, said image generation algorithm executable to generate first and second image data specifying at least one image property of said first and second images respectively;
- whereupon receiving input instructions to display the first image with an altered image properly on the respective first display layer, said image generation algorithm generates new first image data specifying said image property alteration of said first image and new second image data specifying a common image property alteration of said second image, said first and second images then being displayed on said first and second display layers with said common image property alteration.

The first and second images are thus synchronised and therefore a developer only needs to reposition or alter the first image and a corresponding change will occur in the second image. The first and second images will thereby be maintained overlapping and with a constant spatial relationship.

Further aspects and advantages of the present invention will become apparent from the ensuing description which is given by way of example only.

BRIEF DESCRIPTION OF THE DRAWINGS

Further aspects of the present invention will become apparent from the following description which is given by way of example only and with reference to the accompanying drawings in which:

FIG. 1a shows a schematic exploded cross-sectional view of a multi layered display (MLD) in accordance with one preferred embodiment of the present invention;

FIG. 1b shows a schematic exploded perspective view of the MLD of FIG. 1;

FIGS. 3a & 3b respectively show a schematic exploded perspective view and a side elevation of the MLD of FIG. 1 with a synchronised pair of images displayed;

FIGS. 3c & 3d respectively show another schematic exploded perspective view and side elevation of the MLD of FIG. 1 with a synchronised pair of images displayed;

FIGS. 4a & 4b show schematic exploded perspective views of the MLD of FIG. 1 with two synchronised image pairs displayed;

FIGS. 10a & 10b respectively show a target image and a split-ratio depth map according to one embodiment of the present invention;

FIG. 10c shows a schematic exploded perspective view of a composite image formed by performing the method of FIG. 9;

FIGS. 11a & 11b a target image and a split-ratio depth map according to one embodiment of the present invention;

FIG. 11c & 11d respectively show first and second images for display on front and rear display layers of the MLD of FIG. 1;

DETAILED DESCRIPTION

Figure 2:
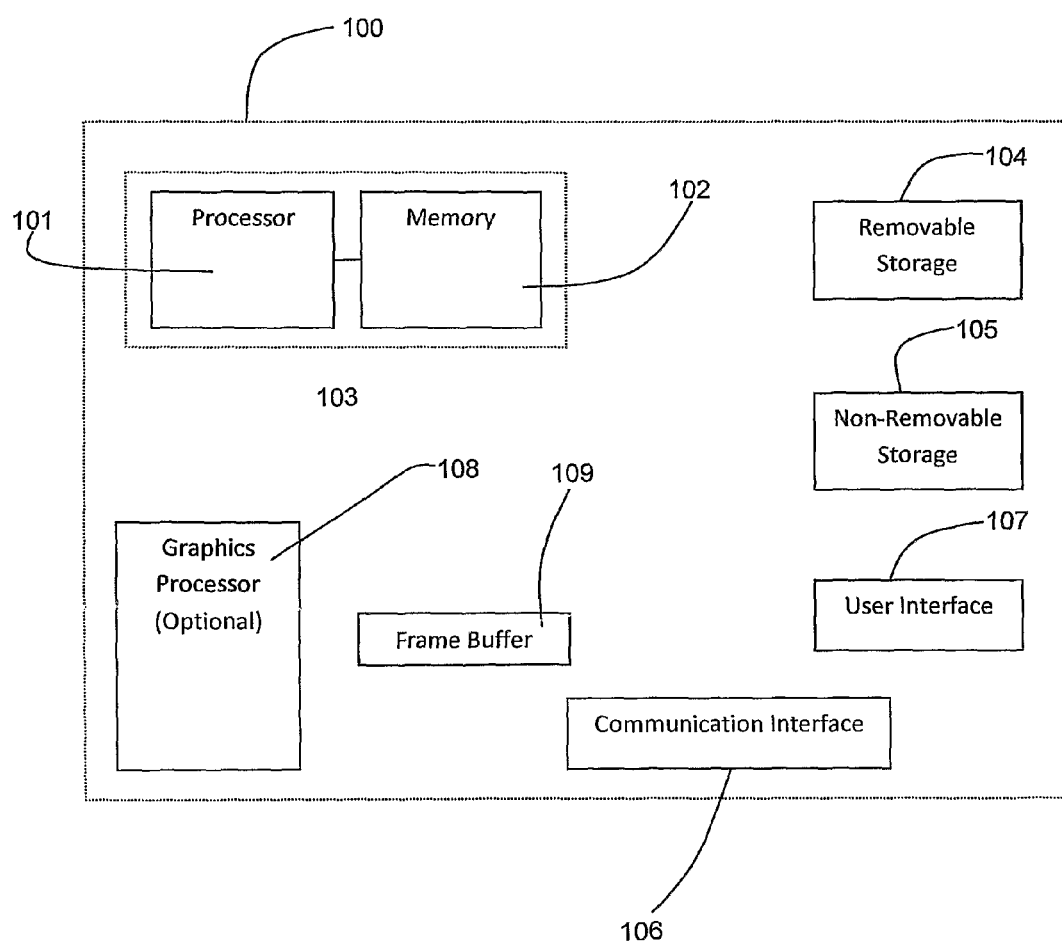
FIG. 2 shows a schematic diagram of an exemplary general purpose computer system platform upon which embodiments of the present invention may be implemented.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, function, or the like, is conceived to be a self-consistent sequence of steps or instructions leading to a desired result. Reference herein will also be made to various "algorithms" which should be understood to refer to one or more computer-implemented processes, procedures, functions, calculations capable of accessing, reading, processing, modifying, creating or otherwise manipulating data.

The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "filtering," "flipping," "generating," "grouping," "hiding," "identifying," "initiating," "interacting," "modifying," "monitoring," "moving," "outputting," "performing," "placing," "positioning," "presenting," "processing," "programming," "querying," "removing," "repeating," "resuming," "sampling," "selecting," "simulating," "sorting," "storing," "subtracting," "suspending," "tracking," "transcoding," "transforming," "transferring," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The FIGS. 1-11 illustrate preferred embodiments of the present invention. As shown in FIG. 1, the methods and systems described are intended for use on a Multi Layered Display ("MLD") or similar display device. An exemplary MLD (1) is shown in FIG. 1 and is composed of first and second display layers provided in the form of front (2) and rear (3) LCD screens. The front (2) and rear (3) screens are positioned, parallel to, but spaced apart from each other with the front screen (2) overlapping the rear screen (3). A backlight array (4) is provided behind the rear screen (3) for providing the necessary light to the LCD screens (2, 3). As will be appreciated by one skilled in the art, each LCD screen (2, 3) includes a respective plurality of pixels capable of forming respective first (5) and second (6) images. The first screen (2) is operable to display the first image (5) using at least some of its pixels and the second screen (3) is operable to display a second image (6) using some of its pixels. The first screen (2) overlaps the second screen (3) and thus can be considered a 'front' screen with the second screen being a 'rear' screen.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a combination of red, green and blue intensities.

It should be apparent to one skilled in the art that a number of alternative display technologies may be utilised in place of the LCD screens (2, 3). Furthermore, although FIG. 1 shows a single screen (1) in front of the rear screen (3) for the sake of clarity and convenience, any number of additional (at least partially transparent) display layers may be incorporated. Such displays provide a three dimensional quality to the scene viewed by an observer, as described in PCT publication Nos. WO/1999/042889 and WO/1999/044095, incorporated by reference herein.

Although, as previously stated, the present invention is not specifically restricted to the use of Liquid Crystal Display screens, for example, OLED, TOLED, Plasma or other display technologies may also be utilised for the first and/or second display layers. However, for ease of reference, embodiments of the present invention will be described using LCD displays. By way of a brief overview of LCDs, there are two main types of Liquid Crystal Displays used in computer monitors, passive matrix and active matrix.

Passive-matrix Liquid Crystal Displays use a simple grid to supply electrical charge to a particular pixel on the display. The grids made from a transparent conductive material (usually indium tin oxide), are formed using two glass layers called substrates, one provided with columns, the other with rows. The rows or columns are connected to integrated circuits that control when a charge is applied to a particular column or row. The liquid crystal material is sandwiched between the two glass substrates, and a polarizing film is added to the outer side of each substrate. To activate a particular pixel, the integrated circuit applies a charge to the relevant column of one substrate whilst grounding the corresponding row on the other substrate. The voltage applied to the intersection of the relevant row and column designating the pixel untwists the liquid crystals at that pixel.

However, the passive matrix system has significant drawbacks, notably slow response time and imprecise voltage control. Response time refers to the Liquid Crystal Displays ability to refresh the image displayed. Imprecise voltage control hinders the passive matrix's ability to influence a single pixel at a time. When voltage is applied to untwist one pixel, the pixels around it also partially untwist, which makes images appear fuzzy and lacking in contrast.

Active-matrix Liquid Crystal Displays depend on thin film transistors (TFT). Thin film transistors are tiny switching transistors and capacitors arranged in a matrix on a glass substrate. To address a particular pixel, the appropriate row is switched on, and then a charge is sent down the correct column. Since all of the other rows that the column intersects are turned off, only the capacitor at the designated pixel receives a charge. The capacitor is able to hold the charge until the next refresh cycle. Furthermore, if the amount of voltage supplied to the crystal is carefully controlled, it can be made to untwist only enough to allow some light through. By doing this in very exact, very small increments, Liquid Crystal Displays can create a greyscale. Most displays today offer 256 levels of brightness per pixel providing a 256-increment greyscale.

A Liquid Crystal Display that can show colours must have three subpixels with red, green and blue (RGB) colour filters to create each colour pixel. Through the careful control and variation of the voltage applied, the intensity of each subpixel can range over 256 shades. Combining the subpixels produces a possible palette of 16.8 million colours (256 shades of red×256 shades of green×256 shades of blue).

Liquid Crystal Displays employ several variations of liquid crystal technology, including super twisted nematics, dual scan twisted nematics, ferroelectric liquid crystal and surface stabilized ferroelectric liquid crystal. There are also emissive technologies such as Organic Light Emitting Diodes which are addressed in the same manner as Liquid Crystal Displays.

However, there are a number of practical considerations need to be addressed to produce a functional displays utilising multiple overlapping LCD screens, including the reduction or elimination of moire interference effects, coloured fringes, and crossed-polarisers, which are addressed in a number of ways including the use of diffusers, optical retarders and other optical materials and/or material finishes.

To aid understanding and for the sake of clarity, the MLD (1) and associated display screens (2, 3) are shown in simplified, schematic form in the drawings.

FIG. 2 shows an exemplary general purpose computer system (100) which may be used to implement embodiments of the present invention. It will be appreciated that the computer system (100) shown in FIG. 2 is exemplary only and embodiments of the present invention may operate within a number of different systems including, but not limited to, embedded computer systems, portable and hand-held computer systems, mobile phones, or any computer system having the same general components or equivalents to the computer system shown in FIG. 2.

The computer system (100) has a processor (101) and at least one system memory (102) coupled by a bus (103) to the processor (101). The processor (101) may comprise a central processing unit (CPU) or other type of processor. Depending on the configuration and/or type of computer system environment, memory (102) may comprise volatile memory (e.g., RAM), non-volatile memory (e.g., ROM, flash memory, etc.), or some combination of the two. Additionally, memory (102) may be removable or non-removable. The computer system (100) may also have additional storage (e.g., removable storage (104), non-removable storage (105) or the like). Removable storage (104) and/or non-removable storage (105) may comprise volatile memory, non-volatile memory, or any combination thereof. Additionally, removable storage (104) and/or non-removable storage (105) may comprise CD-ROM, digital versatile disks (DVD), flash drives, solid state storage devices, or other optical storage, magnetic cassettes, magnetic tape, magnetic disk storage or other magnetic storage devices, or any other medium which can be used to store information for access by the computer system (100).

As shown in FIG. 2, the computer system (100) can communicate with other systems, components, or devices via a communication interface (106). Communication interface (106) may embody computer readable instructions, data structures, program modules or other data in a modulated data signal (e.g., a carrier wave) or other transport mechanism. By way of example, and not limitation, communication interface (106) may couple to wired media (e.g., a wired network, direct-wired connection, etc.) and/or wireless media (e.g., a wireless network, a wireless connection utilizing acoustic, RF, infrared, or other wireless signalling, etc.).

Communication interface (106) also couples the computer system (100) to one or more input devices (107) (e.g., a keyboard, mouse, pen, voice input device, touch input device, etc.). Additionally, communication interface (100) may couple computer system platform (100) to one or more output devices (e.g., a speaker, printer, etc.).

As shown in FIG. 2, optional graphics controller (108) may be provided and configured to receive first (7) and second (8) image data and respectively output a first and second image data signal to the front (2) and rear (3) screens for displaying the first (5) and second (6) images. The graphics controller (108) may perform graphics processing operations on the graphical image data (7, 8) stored in a frame buffer (109) or another memory (e.g. 102, 104 or 105) of computer system platform (100). Graphical data stored in frame buffer (109) may be accessed, processed, and/or modified by components (e.g., graphics controller (108), processor (101)) of computer system (100) and/or components of other systems/devices.

Accordingly, memory (102), removable storage (104), non-removable storage (105), frame buffer (109), or a combination thereof, may comprise instructions that when executed on the processor (101) implement a method of generating images on the multi-layered display (MLD) (1).

According to one aspect, the memory (102) stores computer-readable and computer-executable instructions which in the embodiments shown in FIGS. 3-6 embody an image generation algorithm (9) executable to generate first ( ) and second ( ) image data specifying at least one image property of the first (5) and second (6) images respectively.

When the processor (101) receives input instructions (202) via communication interface (106) to display the first image (5) with an altered image property, e.g. in a new position, on the respective first screen (2) the image generation algorithm (9) generates new first image data (7) specifying the image property alteration of the first image (5) and also new second image data (8) specifying a predetermined image property alteration of the second image (6). The graphics controller (108) then processes the new first (7) and second (8) image data, the first (5) and second (6) images then being displayed on the first (2) and second (3) screens with respective image property alterations.

In the embodiment shown in FIG. 3, the image property of the first image (5) that is altered is its position on the front screen (2), i.e. the first image (5) is moved to the right by a user via a user interface (107) such as a mouse. It will be appreciated that the repositioning of the first image (5) in FIG. 4 is exemplary only and the aforementioned method may be used with any image property alteration which includes, but is not limited to, alteration in: position, dimension, size, scale, colour, contrast, hue, orientation, shadow, visibility, transparency, perceived depth, overlapping order or any other visual property of the first image (5). In response to the repositioning of the first image (5) the image generation algorithm (9) determines a corresponding alteration to be made to the second image (6). The image generation algorithm (9) then generates (205) new first (7) and second (8) image data with which the graphics controller (108) processes to generate image data signals which are passed to the MLD (1) to display the first (5) and second (6) images in their altered state.

The first (5) and second (6) images are thus 'synchronised' such that, when the first image (5) is altered, a corresponding predetermined alteration is made to the second image (6) in response.

In the example shown in FIGS. 3a and 3b, the alteration to the second image (6, 6') is also a repositioning (to 6') by the same distance to match the repositioning of the first image (5), thereby maintaining the spatial relationship between the first (5, 5') and second (6, 6') images. The first (5, 5') and second (6, 6') images are thus synchronised to move with each other and therefore a user only has to provide move instructions to one of the images, (5) or (6), in order to 'move' both.

Where the first (5) and second (6) images are overlapping 'windows' or 'components' of a common application GUI the predetermined image property alteration of the second image is typically identical to the alteration applied to the first image so that the visual and spatial relationship of the 'windows' is maintained, as shown in FIGS. 3a and 3b. One example of where it may be useful to maintain the spatial relationship between overlapping 'windows' is in a picture editing application where the first and second images are provided in the form of front and rear application windows of a picture editing application, with the rear window containing toolbars while the front window has the picture to be edited. Synchronising the windows together thus allows a user to maintain the picture close to the toolbars so that they can easily select appropriate editing tools.

In the example shown in FIGS. 3c and 3d the alteration to the second image (6) is non-identical and involves both a resizing and a repositioning to a non-overlapping position (6').

The examples shown in FIG. 3 illustrate only two possible alteration combinations and are exemplary only. It will be appreciated that there are innumerable possible combinations and permutations of alterations.

The predetermined rules determining the alteration combination can be set in the image generation algorithm (9) to suit each application, event sequence or user requirements.

Figure 5:
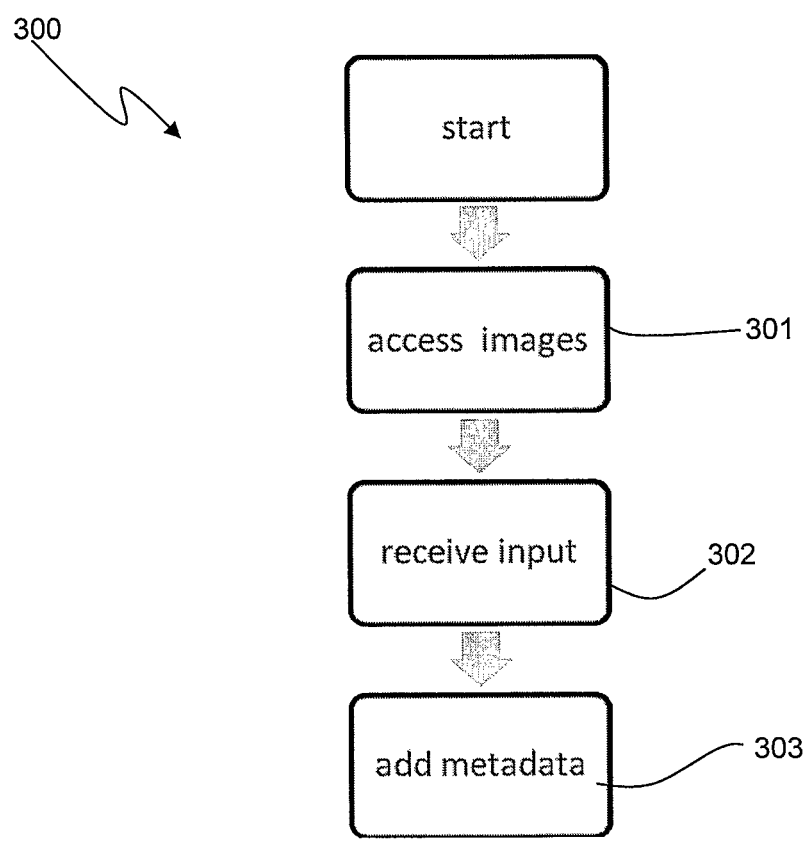
FIG. 5 shows a flowchart of an exemplary computer-implemented method for synchronising images in accordance with one embodiment of the present invention.
Figure 6:
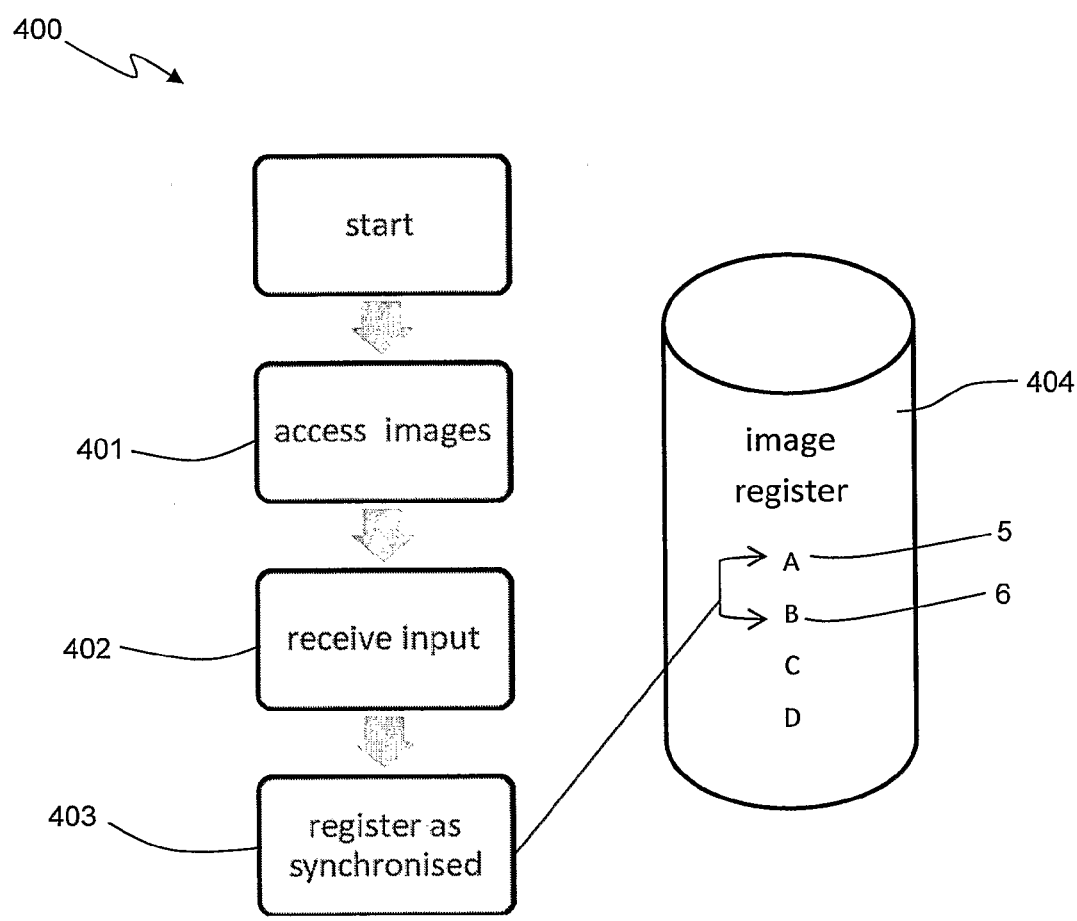
FIG. 6 shows a flowchart of an exemplary computer-implemented method for synchronising images in accordance with another embodiment of the present invention.

It will also be appreciated that more than two images may be synchronised, as shown in FIG. 5, where the MLD (1) displays two pairs of first (5a, 5b) and second (6a, 6b) images respectively displayed on the front (2) and rear (3) display screens. In the example shown in FIG. 5a, the spatial relationship between the first images (5a, 5b) on the front screen (2) can be altered independently of the spatial relationship between the second images (6a, 6b) on the rear screen (3) and thus the stack order (also known as "Z" or "depth" order) of overlapping first images (5a, 5b) can be altered without affecting the stack order of the second images (6a, 6b) on the rear screen (3). However, where the stack order or other spatial relationship is important to be maintained on both screens (2, 3), e.g. where an image pair (5a & 6a or 5b & 6b) forms two integrated parts of a common software application, the image generation algorithm (7) is configured to generate new image data (7, 8) such that the second images (6a, 6b) is displayed in the same stack order as the first image (5a, 5b). Thus, if there is any alteration in stack order of the first images (5a, 5b), the second images (6a, 6b) will also be displayed in the same stack order to maintain a common stack order of images on both the front (2) and rear (3) screens.

In order to identify synchronised images, the memory stores metadata specifying that two or more images, e.g. first (5) and second (6) images, are images to be treated as synchronised.

FIG. 5 shows one possible method (300) of synchronising the images by adding (303) a common computer-readable metadata identifier or the like to the image data (7, 8) of each image belonging to a synchronised set. This metadata identifier is also stored in the computer system memory (102) and specifies that two or more images, e.g. first (5) and second (6) images, are a pair of synchronised images. In the embodiment shown in FIG. 6, when a first image (5) is altered to (5'), the image generation algorithm (9) runs a procedure to process the first image data (7) and identify the metadata identifier code (if present) and then process each set of image data for the second image and any others to determine if any such images have a matching metadata identifier. If a matching metadata identifier is found, the images are considered synchronised.

In order to apply the metadata, a developer or user accesses (301) the images displayed (or capable of being displayed) and selects at least two images then provides input instructions (302) that the selected images are to be treated as synchronised by adding metadata. In one embodiment, the user input may take the form of a manual selection, e.g. a mouse LEFT-CLICK on two images while holding a keyboard SHIFT or CTRL key. Alternatively, the metadata may be automatically added to images of synchronised sets according to particular rules, randomly or in response to predetermined events. The "receive input" (302) step may thus comprise receiving input from the processor (101) or one or more external sources, e.g. via input device (107) or communication interface (106).

Figure 7:
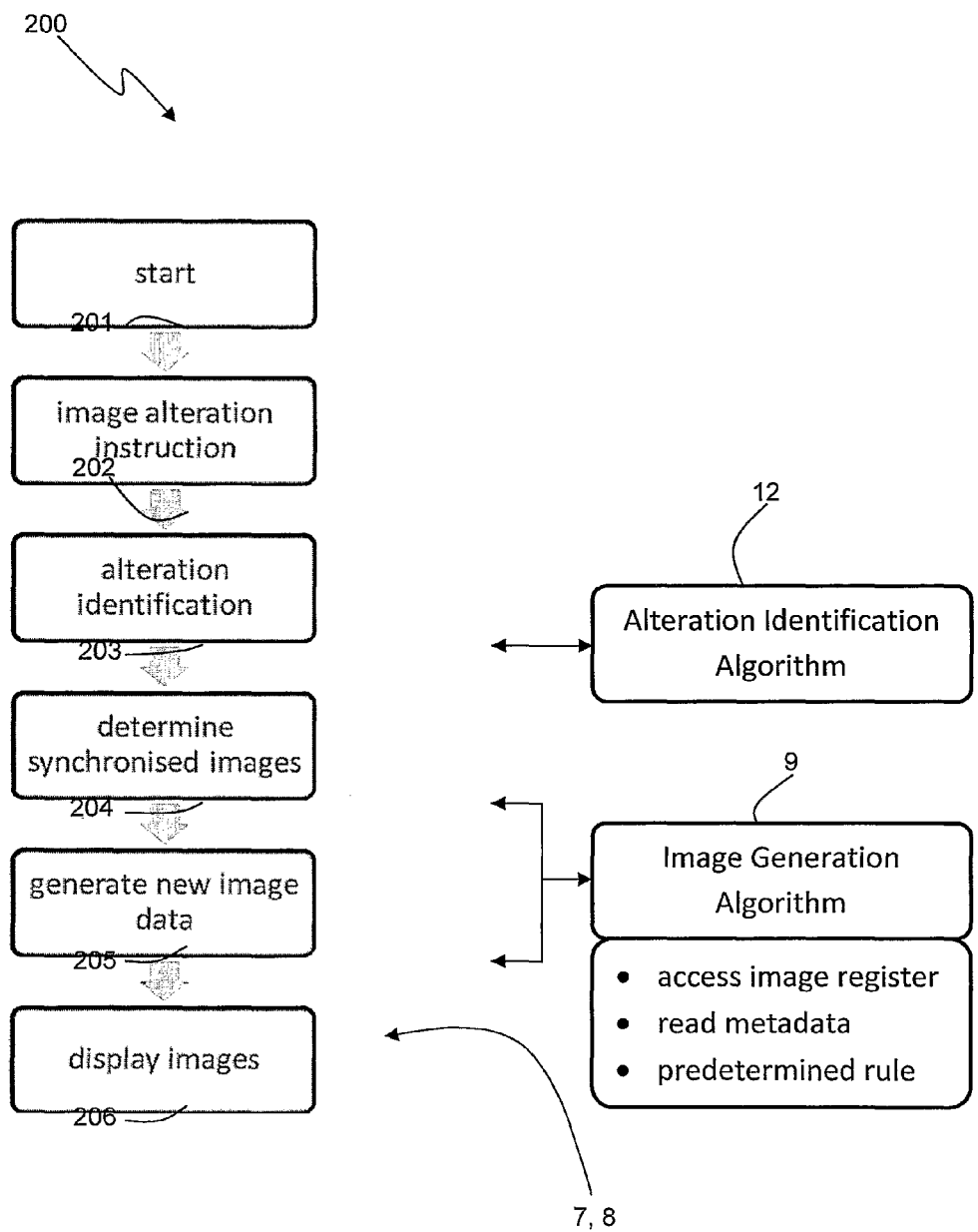
FIG. 7 shows a flowchart of an exemplary computer-implemented method for altering synchronised images in accordance with one embodiment of the present invention.

FIG. 7 shows an alternative embodiment where the metadata takes the form of an image register (404) containing a database of the images (A-D) displayed and whether or not any two or more images form a synchronised pair, e.g. images "A" and "B" which may include first (5) and second (6) images. A user or procedure may access (401) the images (A-D) and then provide an input instruction (402) that two such images (5 & 6) are to be synchronised. A synchronisation registration entry (403) is then made to the register (404) which records that the first (5) and second (6) images are synchronised. Thus, the image generation algorithm (9) may subsequently process the first image data (7) and query the register (404) to determine if a first image (5) to be altered is synchronised with a second image (6). If a synchronised second image (6) exists in the register (404) the first (5) and second (6) images are considered synchronised.

In another embodiment, images may be considered synchronised according to a predetermined rule(s). For example, in one embodiment the image generation algorithm (9) includes a procedure executable to identify a predetermined common attribute of the first (5) and second (6) image which are thus considered synchronised. The common attribute may be any image property or any other attribute, e.g. as shown in FIG. 3a, first (5) and second (6) images running in the same software application may be considered to have common attributes. Thus, images on both screens (2, 3) belonging to the same software application are synchronised.

In another embodiment, the metadata may be considered to be "x" and "y" co-ordinates (i.e. two-dimensional coordinates) representative of the spatial position of the first (5) and second (6) images on the respective first (2) and second (3) screens. If the x and y coordinates of the first (2) and second (3) images are the same (i.e. there is an overlap), the images (5, 6) are considered synchronised.

FIG. 7 shows the general process (200) for displaying synchronised images on the MLD (1). After start (201) the first step involves receiving an image alteration instruction (202) which may be a manual alteration by a user or may occur automatically in response to a predetermined event.

The image alteration is detected (203) by an alteration detection algorithm (12) which runs as a background process for identifying an alteration to an image property and returning data relating to the image property altered and the image the alteration relates to. The alteration detection algorithm (12) includes a "global hook" procedure which detects all image property alteration events and identifies the image altered.

The detection (203) of an image alteration event triggers execution of the image generation algorithm (9) which then determines (204) if the altered image is synchronised with any other images. This 'determine' step (204) uses one of the aforementioned methods, i.e. accessing an image register (207), reading image metadata (208) or applying a predetermined rule (209) to identify any synchronised images.

If a synchronised image is located, the image generation algorithm (9) generates (205) new first image data (7) specifying the image property alteration of the first image (5) and new second image data (8) specifying a predetermined image property alteration of the second image (6). The first (5) and second (6) images are then displayed on the front (2) and rear (3) LCD screens of the MLD (1) with the respective image property alterations, e.g. repositioned etc.

If a synchronised image is not located, the image generation algorithm (9) only generates new first image data (7)

specifying the image property alteration of the first image (5). The first image (5) is then displayed on the first LCD screen (2) with the image property alteration, any other images are displayed without alterations or with alterations as independently specified.

Figure 8:
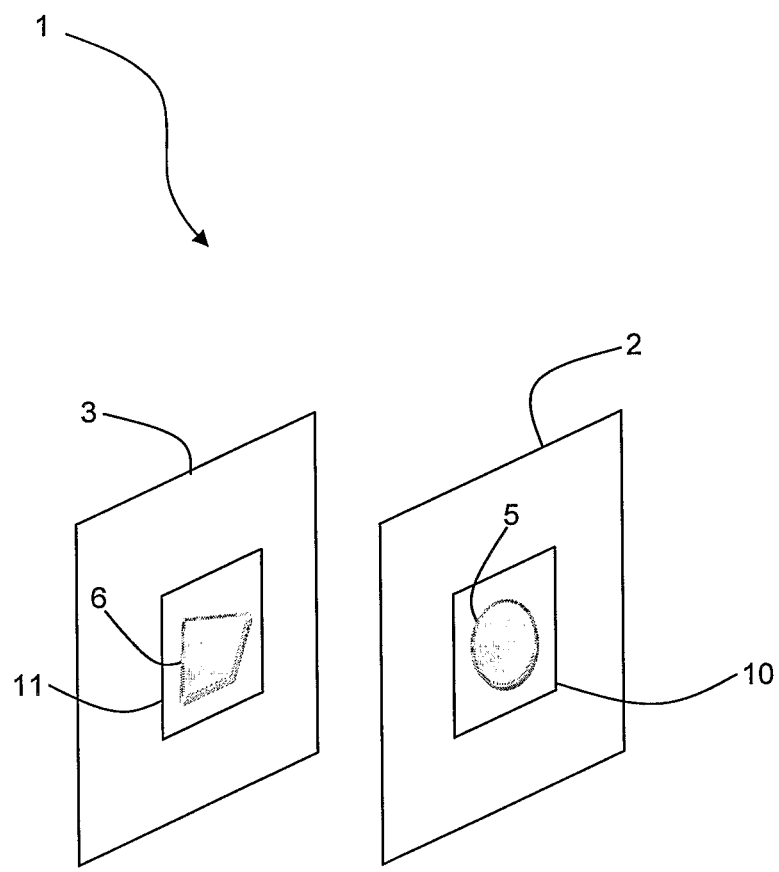
FIG. 8 respectively shows a schematic perspective view of the MLD of FIG. 1 with a synchronised pair of images displayed.

As shown in FIG. 8, images may also be synchronised by displaying the first (5) and second (6) images in pre-synchronised front (10) and rear (11) application 'windows'. These 'windows' (10, 11) are configured for display on the respective front (2) and rear (3) display screens and thus the first (2) and second (3) images will automatically be displayed on the same screen as the corresponding 'window' (10, 11). The front window (10) is synchronised with the rear window (11) and therefore any alterations to the front window (10) will result in corresponding alterations to the rear window (11), e.g. if the front window (10) is 'moved' or resized, the rear window (11) is 'moved' or resized accordingly. By default, only the front window (10) has user controls for moving and resizing. The image generation algorithm (9) is thus executable to generate image data (7, 8) corresponding to the synchronised front (10) and rear (11) windows with any images (5, 6) displayed therein. Since all of the application window's (10, 11) runtime code is executed within the application's own execution thread, no other support processes need to be running to identify synchronised images (5, 6) or other image alteration events.

The application windows (10, 11) may also operate as an editing or development environment (500), e.g. a picture editing application may be embedded in the application windows (10, 11) so that a user can edit pictures therein. A user may thus simultaneously view both front (10) and rear (11) windows and any pictures/content (5, 6) therein. Such a multi-layered development environment (500) greatly enhances the ease with which a developer may develop multi-layered images and other effects as the developer can preview the visual appearance of their work as they develop it.

Figure 9:
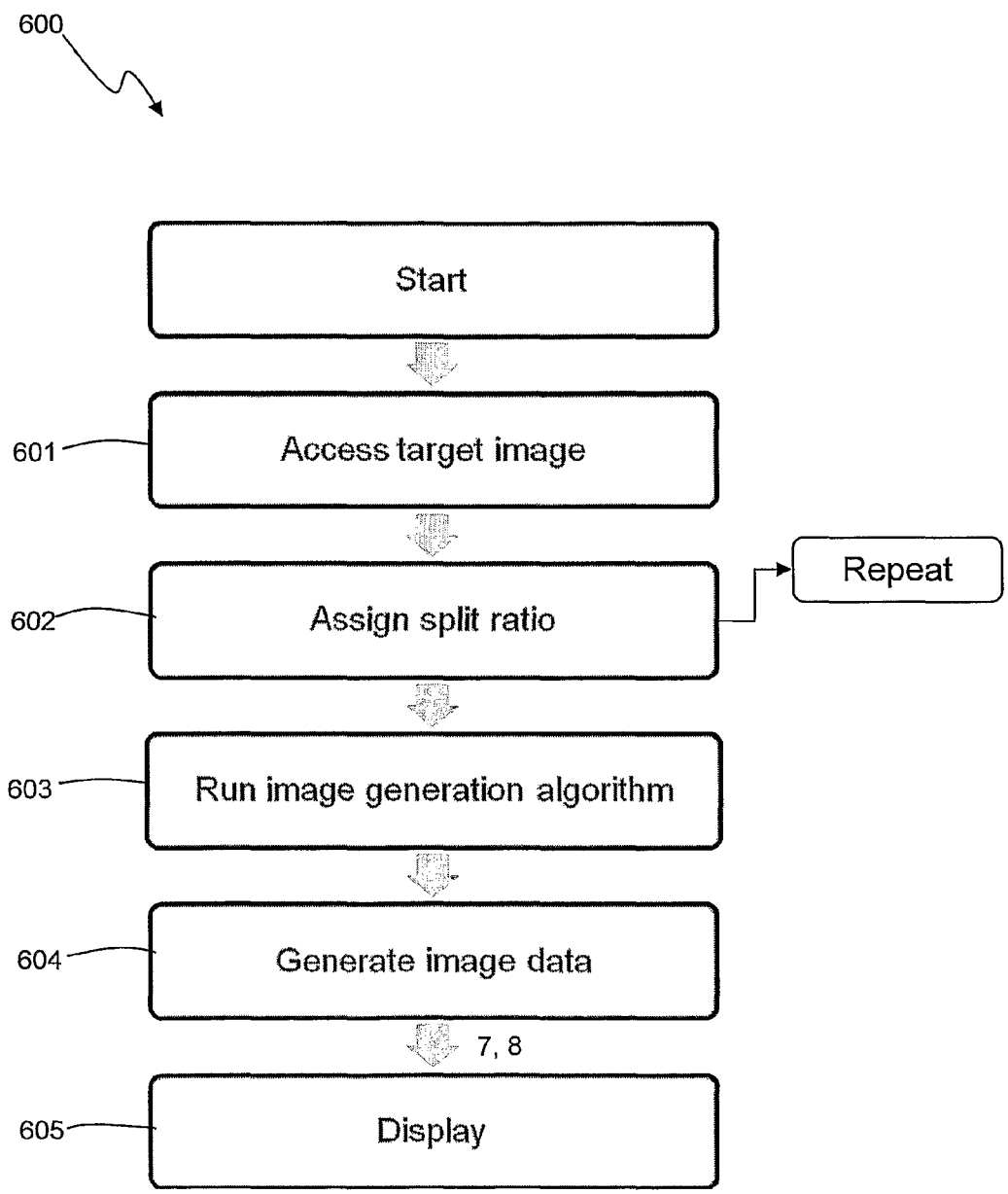
FIG. 9 shows a flowchart of an exemplary computer-implemented method for displaying a composite image with a simulated variable depth in accordance with one embodiment of the present invention.

FIG. 9 shows another method of generating images for display on the MLD (1) and may also be implemented using the computer system (100). The method (600) includes the steps of:

a) accessing (601) a target image (13);
b) assigning (602) a split-ratio to an image property of at least one portion of the target image (13), the split-ratio specifying the first and second proportions of the image property of the target image portion that are to be respectively displayed as first (5) and second (6) images on the front (2) and rear (3) screens;
c) repeating (603) step b) for each portion of the target image (13) to generate a split-ratio depth map for the target image (13);
d) executing (604) an image generation algorithm (9) that for each target image portion generates:
   first image data (7) for the first image (5) for display on the front screen (2), wherein at least some of the front screen's pixels display the first image property proportion of the target image portion;
   second image data (7) for the second image (6) for display on the rear screen (3) such that at least some of the rear screen's pixels display the second image property proportion of the target image portion.

FIGS. 10 and 11 show the visual effect of performing the aforementioned method. The target image (13) is shown as three concentric squares (14, 15, 16) in FIG. 10a and as a flower pattern (17) with a white portion (18) and a coloured portion (19).

In the examples shown in FIGS. 10 and 11 the image property to which the split-ratio is assigned is the pixel brightness or intensity of the target image (20), though it will be appreciated this is exemplary only and the image property could be pixel colour, contrast, hue or other image property capable of being visually represented by a scale.

The split-ratio of an image property is a 'depth' value that is assigned to each target image portion. In the embodiments shown in FIGS. 10 and 11 the 'depth' value is provided as a greyscale value between full black (low intensity) assigned a value of "0" and full white (high intensity) which is assigned a value of "1". If a target image portion (e.g. square (14) or flower petal inner edge (21)) is assigned a value of 1, that target image portion (14, 21) is displayed only as part of the first image (5) on the front screen (2) and conversely a target image portion (e.g. square (16), or flower edge (22)), assigned a greyscale value of 0 is only displayed as part of the second image (6) on the rear screen (3) or vice versa. A target image portion (e.g. square (15), or flower petal (23)) assigned an intermediate greyscale value will be displayed in both the first (5) and second (6) images on both screens (2, 3) but with the pixel intensity differing in each image (5, 6). For example, if the square (15) is assigned a split-ratio of 0.7 the square (15) is displayed in the second image (6) with an intensity of 0.7 and displayed in the first image (5) with an intensity of 0.3.

The split-ratio depth map (20) is applied to the target image (13) to generate first (5) and second (6) images which form a composite image (30) that appears similar to the target image (13) but is perceived as being distributed between the screens (2, 3) with different portions at different perceived depths. The first (7) and second (8) image data that is used to form the first (5) and second (6) images is generated by the image generation algorithm (9) which calculates the pixel intensity value for each pixel of the first (5) and second (6) images according to the following function.

Each pixel of the origin image (13) has a depth value Z as per the depth map (20) and a colour R (red), G (green), B (blue) intensity values, wherein the intensity value of said R, G, B colour intensities are defined by:

$$t = P((Z-Z1)/(Z2-Z1), 0, 1)$$

$$R1 = Q(R, t)$$

$$R2 = Q(R, 1-t)$$

$$G1 = Q(G, t)$$

$$G2 = Q(G, 1-t)$$

$$B1 = Q(B, t)$$

$$B2 = Q(B, 1-t)$$

Where:
Z1 is the depth of the first display layer;
Z2 is the depth of the second display layer;
Z is the depth of the target image portion as assigned by the depth map;
P is a function of the depth of the target image portion, (assigned a value between 0 and 1) relative to the depth (Z1 Z2) of the first and second display layers;
t is a split-ratio value assigned by the function P for a particular depth Z value;
Q is a function of the split-ratio value;
R1 is the R intensity value of the first image portion;
R2 is the R intensity value of the second image portion;
G1 is the G intensity value of the first image portion;
G2 is the G intensity value of the second image portion;
B1 is the B intensity value of the first image portion;
B2 is the B intensity value of the second image portion;

While a linear Q function may be used, in most applications the R, G, and/or B intensity values are calculated by a Q function which is proportional to the square root of the split-ratio value t.

The split-ratio depth map (20) may be applied the same to each colour channel (e.g. Red Green Blue (RGB)) of each target image portion or separate Q functions may be provided for each colour channel.

As shown in FIGS. 10 and 11, the split-ratio depth map (20) is typically represented by a 2D greyscale image of the target image (13) with the greyscale representing the required split-ratio. The depth map (20) can thus be created using common 2D image editing tools and thereby obviates the need for many of the problematic prior art MLD image-editing tools.

Such varying of the pixel intensity of overlapping portions of the first (5) and second (6) images enables a composite image (30) to be displayed which is perceived by the viewer as being depth-distributed between the screens (2, 3) with portions at some point intermediate, on, in front of or behind the screens (2, 3) depending on the split-ratio as assigned by the depth map (20).

An example of this depth distribution is shown in the examples of FIGS. 10 and 11.

In FIG. 10, the largest square (14) is assigned a depth value of 0 by the split-ratio depth map (20), i.e. the corresponding depth map large square (24) is drawn as full white and is drawn at a corresponding position (x,y) to the square (14) on the target image (13). The large square (20) is therefore displayed as part of the first image (5) only. Conversely, the smallest square (16) is assigned a depth value of 0 by the corresponding depth map small square (26) being black and is therefore displayed as part of the second image (5) only. The intermediate square (15) has a depth value of 0.5 as the corresponding depth map greyscale square (25) has a grey value of 0.5. The intermediate square (15) is thus displayed as two parts (15a, 15b), one part (15a or 15b) on each of the first (5) and second (6) images but at half-intensity value.

The brightness transition between the large and small squares is bridged by the intermediate square (15) which is therefore perceived to be displayed at a depth half-way between the screens (2, 3) on an illusory plane (27).

A similar method is performed in FIG. 11 where the target image is a 2D flower pattern (17) having an outer coloured border portion (19) surrounding a white centre portion (18). A depth map (20) is created for the flower pattern (17) and is applied by the image generation algorithm (20) to generate a first (5) and second (6) image pair. The first (5) and second (6) images each have pixels with a brightness value dependent on the corresponding pixels in the depth map (20) and target image (13). The resultant composite image formed when the first (5) and second (6) images are overlapping will thus appear to be three-dimensional and distributed between the screens (2, 3)

In order to maintain the spatial relationship between the first (5) and second (6) images, they are synchronised using the synchronisation method shown in FIG. 7.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

Aspects of the present invention have been described by way of example only and it should be appreciated that modifications and additions may be made thereto without departing from the scope thereof.

The invention claimed is:

1. A computer-implemented method for processing data, said method comprising:
  generating first data for displaying a first image on a first display screen of a display device;
  generating second data for displaying a second image on a second display screen of said display device, wherein said first and second display screens overlap;
  receiving an alteration of at least one property of said first image and generating fourth data for displaying said first image as altered on said first display screen;
  determining that said first image and said second image define a synchronized pairing of images, such that manipulations to said first image are reflected in said second image;
  responsive to said alteration of at least one property of said first image, determining an alteration of at least one property of said second image based on a relationship of said synchronized pairing between said first and second images;
  automatically generating third data for displaying said second image on said second display screen in accordance with said alteration of at least one property of said second image;
  displaying said first image as altered on said first display screen; and
  displaying said second image as altered on said second display screen simultaneously with said displaying said first image as altered on said first display screen.

2. The method of claim 1, wherein said at least one property of said first image is selected from a group consisting of: a position; an overlapping order of said first image with respect to said second image; a depth; a size; a scale; a color; a contrast; a hue; an orientation; a shadow; a visibility; a transparency; a brightness; and an alpha value.

3. The method of claim 1, wherein said at least one property of said second image is selected from a group consisting of: a position; an overlapping order of said second image with respect to said first image; a depth; a size; a scale; a color; a contrast; a hue; an orientation; a shadow; a visibility; a transparency; a brightness; and an alpha value.

4. The method of claim 1, wherein said at least one property of said first image is the same as said at least one property of said second image.

5. The method of claim 1, wherein said at least one property of said first image is different from said at least one property of said second image.

6. The method of claim 1, wherein said alteration of at least one property of said first image is selected from a group consisting of a user-initiated alteration and an automated alteration.

7. The method of claim 1, wherein said relationship is specified by a user.

8. The method of claim 1, wherein said relationship is automatically determined based on an attribute selected from a group consisting of an overlap of said first and second images and an association with at least one software application.

9. A system comprising a processor and a memory, wherein said memory comprises instructions that when executed by said system implement a method of processing data, said method comprising:

generating first data for displaying a first image on a first display screen of a display device;

generating second data for displaying a second image on a second display screen of said display device, wherein said first and second display screens overlap;

receiving an alteration of at least one property of said first image and generating fourth data for displaying said first image as altered on said first display screen;

determining that said first image and said second image define a synchronized pairing of images, such that manipulations to said first image are reflected in said second image;

responsive to said alteration of at least one property of said first image, determining an alteration of at least one property of said second image based on a relationship of said synchronized pairing between said first and second images;

automatically generating third data for displaying said second image on said second display screen in accordance with said alteration of at least one property of said second image;

displaying said first image as altered on said first display screen; and displaying said second image as altered on said second display screen simultaneously with said displaying said first image as altered on said first display screen.

10. The system of claim 9, wherein said at least one property of said first image is selected from a group consisting of: a position; an overlapping order of said first image with respect to said second image; a depth; a size; a scale; a color; a contrast; a hue; an orientation; a shadow; a visibility; a transparency; a brightness; and an alpha value.

11. The system of claim 9, wherein said at least one property of said second image is selected from a group consisting of: a position; an overlapping order of said second image with respect to said first image; a depth; a size; a scale; a color; a contrast; a hue; an orientation; a shadow; a visibility; a transparency; a brightness; and an alpha value.

12. The system of claim 9, wherein said at least one property of said first image is the same as said at least one property of said second image.

13. The system of claim 9, wherein said at least one property of said first image is different from said at least one property of said second image.

14. The system of claim 9, wherein said alteration of at least one property of said first image is selected from a group consisting of a user-initiated alteration and an automated alteration.

15. The system of claim 9, wherein said relationship is specified by a user.

16. The system of claim 9, wherein said relationship is automatically determined based on an attribute selected from a group consisting of an overlap of said first and second images and an association with at least one software application.

17. A display device comprising:

a first display screen operable to display a first image; and a second display screen operable to display a second image, wherein said first and second display screens overlap, and wherein said first display screen is further operable to display said first image as altered in accordance with an alteration of at least one property of said first image, and wherein said second display screen is further operable to display said second image as altered in accordance with an alteration of at least one property of said second image generated in response to said alteration of at least one property of said first image, and wherein said alteration of at least one property of said second image is determined based on a relationship between said first and second images defined by a synchronized pairing between said first and second images, wherein said second image as altered is displayed on said second display screen simultaneously with said first image as altered on said first display screen.

18. The display device of claim 17, wherein said at least one property of said first image is selected from a group consisting of: a position; an overlapping order of said first image with respect to said second image; a depth; a size; a scale; a color; a contrast; a hue; an orientation; a shadow; a visibility; a transparency; a brightness; and an alpha value.

19. The display device of claim 17, wherein said at least one property of said second image is selected from a group consisting of: a position; an overlapping order of said second image with respect to said first image; a depth; a size; a scale; a color; a contrast; a hue; an orientation; a shadow; a visibility; a transparency; a brightness; and an alpha value.

20. The display device of claim 17, wherein said at least one property of said first image is the same as said at least one property of said second image.

21. The display device of claim 17, wherein said at least one property of said first image is different from said at least one property of said second image.

22. The display device of claim 17, wherein said alteration of at least one property of said first image is selected from a group consisting of a user initiated alteration and an automated alteration.

23. The display device of claim 17, wherein said relationship is specified by a user.

24. The display device of claim 17, wherein said relationship is automatically determined based on an attribute selected from a group consisting of an overlap of said first and second images and an association with at least one software application.

* * * * *